United States Patent [19]
Thayer et al.

[11] Patent Number: 5,168,568
[45] Date of Patent: Dec. 1, 1992

[54] DELAYING ARBITRATION OF BUS ACCESS IN DIGITAL COMPUTERS

[75] Inventors: John S. Thayer, Houston; Paul R. Culley, Cypress; Montgomery C. McGraw, Spring, all of Tex.

[73] Assignee: Compaq Computer Corporation, Houston, Tex.

[21] Appl. No.: 307,359

[22] Filed: Feb. 6, 1989

[51] Int. Cl.⁵ ............................................. G06F 13/36
[52] U.S. Cl. ................................. 395/725; 364/242.6; 364/242.7; 364/242.92; 364/240.8; 364/937.01; 364/940.2; 364/941.2; 364/941.8; 364/941.9; 364/DIG. 2
[58] Field of Search ............... 364/200, 900; 395/325, 395/725

[56] References Cited

U.S. PATENT DOCUMENTS

| | | | |
|---|---|---|---|
| Re. 31,318 | 6/1983 | Kaufman et al. | 364/200 |
| 4,025,903 | 5/1977 | Kaufman et al. | 340/172.5 |
| 4,100,601 | 7/1978 | Kaufman et al. | 364/200 |
| 4,124,889 | 11/1978 | Kaufman et al. | 364/200 |
| 4,245,300 | 1/1981 | Kaufman et al. | 364/200 |
| 4,258,418 | 3/1981 | Heath | 364/200 |
| 4,261,034 | 4/1981 | Saccomano et al. | 364/200 |
| 4,313,160 | 1/1982 | Kaufman et al. | 364/200 |
| 4,402,040 | 8/1983 | Evett | 364/200 |
| 4,417,302 | 11/1983 | Chimienti et al. | 364/200 |
| 4,435,782 | 5/1984 | Kaufman et al. | 364/716 |
| 4,451,884 | 5/1984 | Heath et al. | 364/200 |
| 4,463,445 | 7/1984 | Grimes | 364/900 |
| 4,509,113 | 4/1985 | Heath | 364/200 |
| 4,534,011 | 8/1985 | Andrews et al. | 364/200 |
| 4,554,628 | 11/1985 | Bell | 364/200 |
| 4,571,672 | 2/1986 | Hatada et al. | 364/200 |
| 4,596,004 | 6/1986 | Kaufman et al. | 364/233 |
| 4,727,479 | 2/1988 | Kirrmann | 364/200 |
| 4,750,168 | 6/1988 | Trevitt | 370/85 |
| 4,779,089 | 10/1988 | Theus | 364/200 |
| 4,787,033 | 11/1988 | Bomba et al. | 364/200 |
| 4,800,484 | 1/1989 | Baize et al. | 364/200 |
| 4,964,034 | 10/1990 | Jaskowiak | 364/200 |
| 4,974,148 | 11/1990 | Matteson | 395/325 |
| 4,979,099 | 12/1990 | Milia et al. | 395/325 |
| 4,987,529 | 1/1991 | Craft et al. | 364/200 |
| 4,991,085 | 2/1991 | Pleva et al. | 395/275 |
| 5,088,024 | 2/1992 | Vernon et al. | 395/725 |

OTHER PUBLICATIONS

Jon, Shiell, "The 32-Bit Micro Channel", Byte Magazine, 1987 Extra Edition, pp. 59–64.
G. Michael Vose, "The Technical Implications Of The PS/2", Byte Magazine, 1987 Extra Edition, pp. 33–44.
Jim Seymour, "IBM's Bold New Move", PC Magazine, Jul. 1987, pp. 107–110.
Gus Venditto, "IBM Personal System/2 Model 30", PC Magazine, Jul. 1987, pp. 114–118.
Winn L. Rosch, "IBM Personal System/2 Model 50", PC Magazine, Jul. 1987, pp. 122–131.
Winn L. Rosch, "IBM Personal System/2 Model 60", PC Magazine, Jul. 1987, pp. 136–155.
Bill Machrone, "Bus Stop", PC Magazine, Jul. 1987, pp. 153–155.
Charles Petzold, "Smooth Operator", PC Magazine, Jul. 1987, pp. 157–164.
Paul Somerson, "DOS Lives", PC Magazine, Jul. 1987, pp. 175–182.
Steve Ciarcia, "The New Generation", Byte Magazine, Aug. 1987, p. 99.
Curtis Franklin and Richard Grehan, "The IBM PS/2 Model 80", Byte Magazine, Nov. 1987, pp. 143–148.
The IBM PS/2 Model 50 Technical Reference Manual, Jul. 1987, §2, pp. 2-6-2-16, 2-66-2-74.

Primary Examiner—David L. Clark
Assistant Examiner—Maria N. Von Buhr
Attorney, Agent, or Firm—Pravel, Gambrell, Hewitt, Kimball & Krieger

[57] ABSTRACT

A bus arbitration protocol and accompanying bus arbitration logic for multiple-processor computer systems in which each processing module has a local cache. Several bus arbitration policies are enforced on contending devices which effectively introduce delay states into the arbitration behavior exhibited by each device. The bus arbitration protocol employs a distributed method of arbitration control involving an essentially fixed prioritization of arbitrating devices.

28 Claims, 9 Drawing Sheets

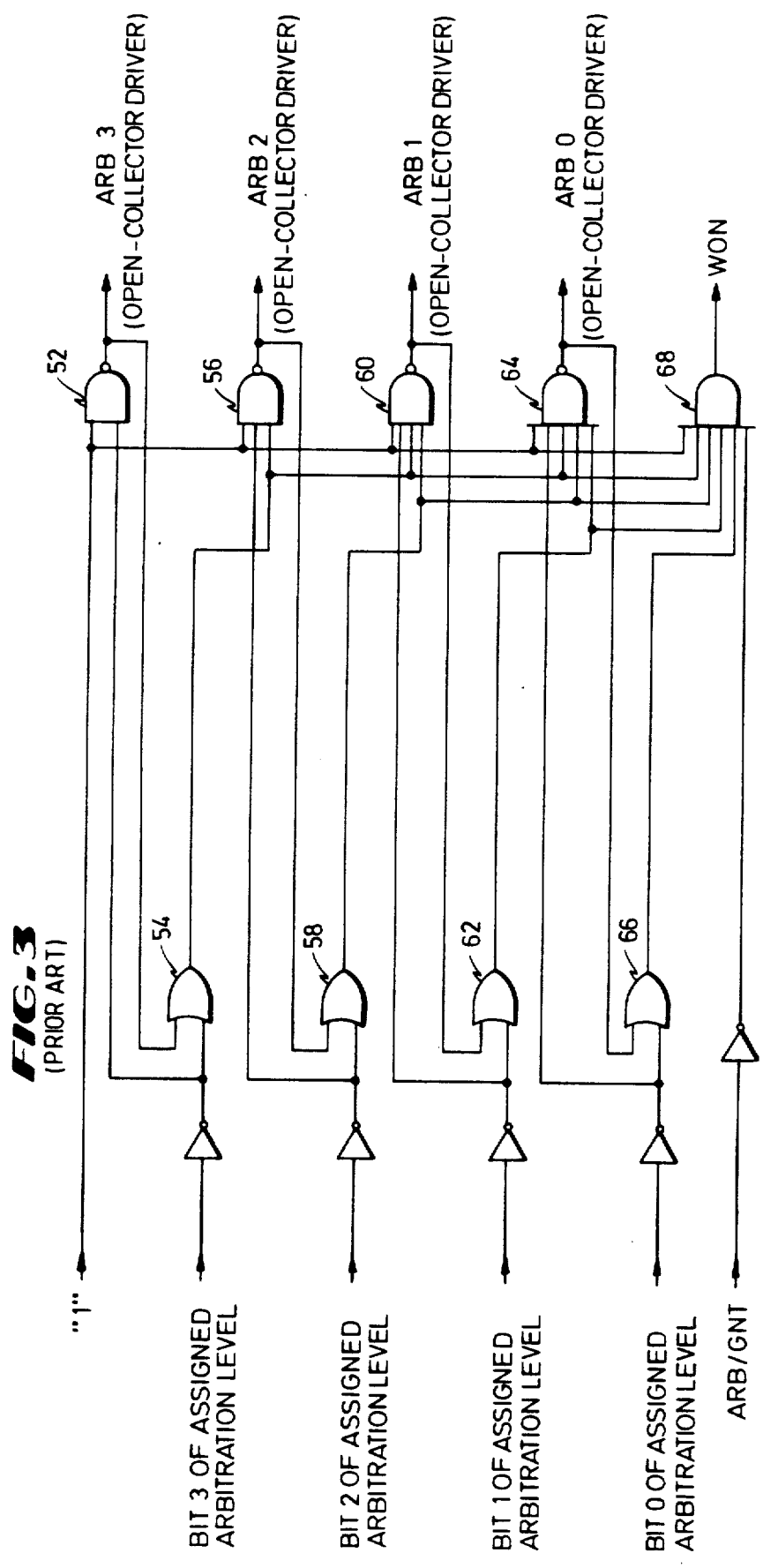

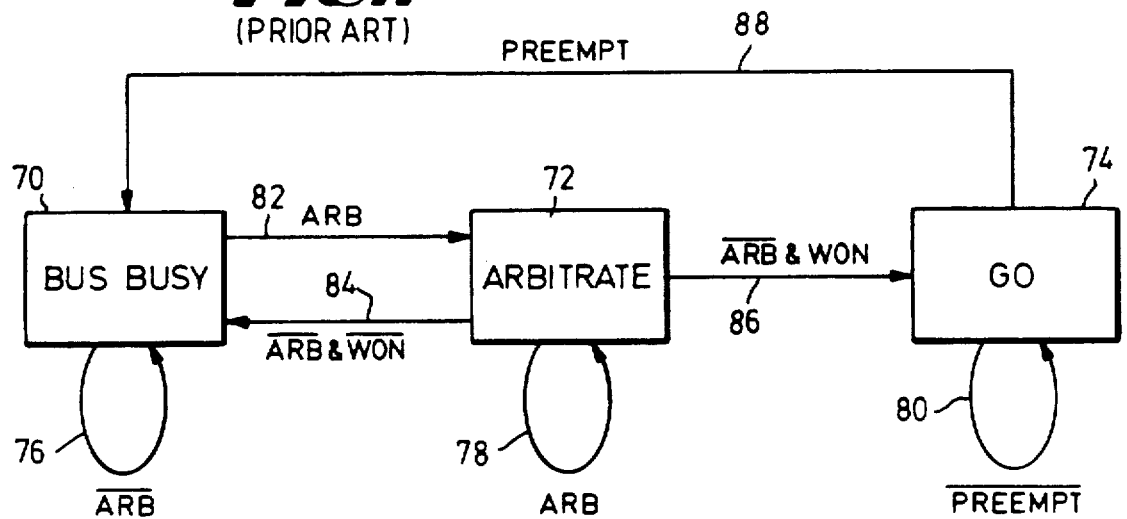
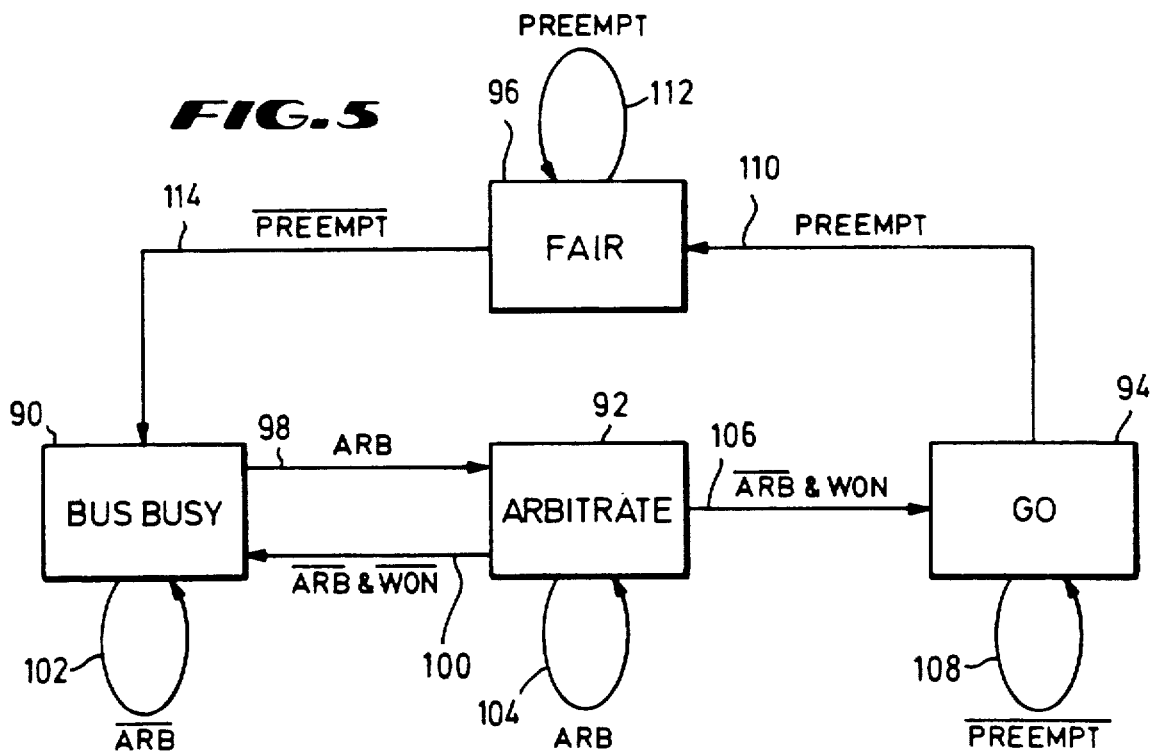

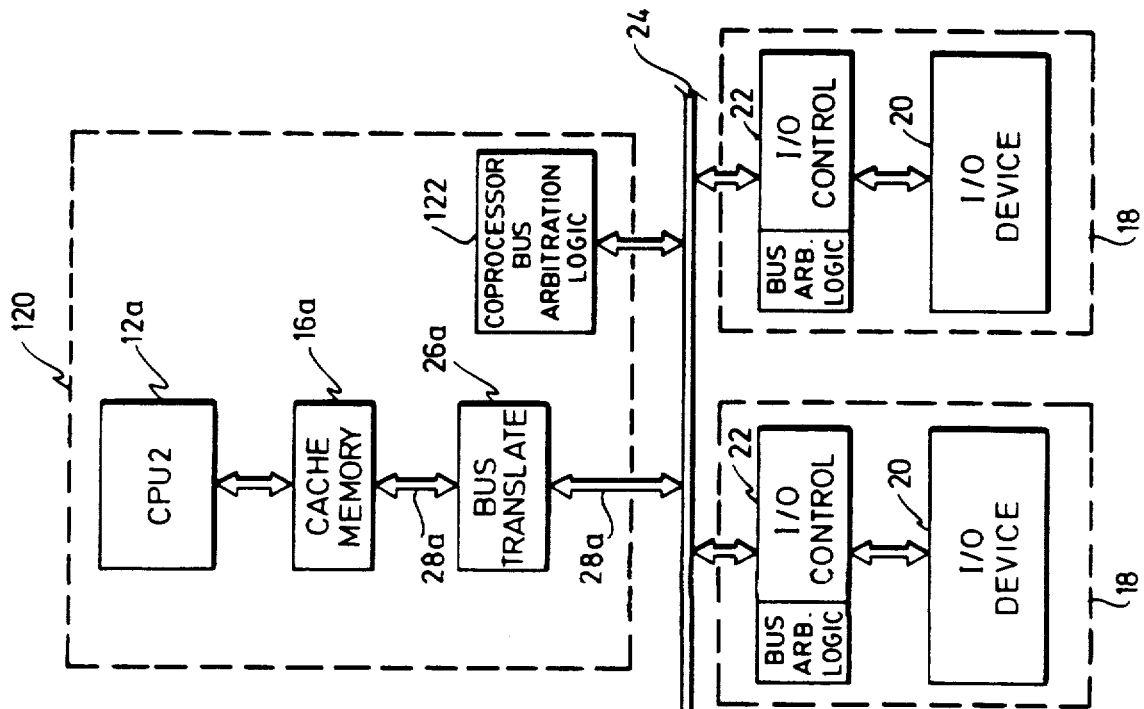
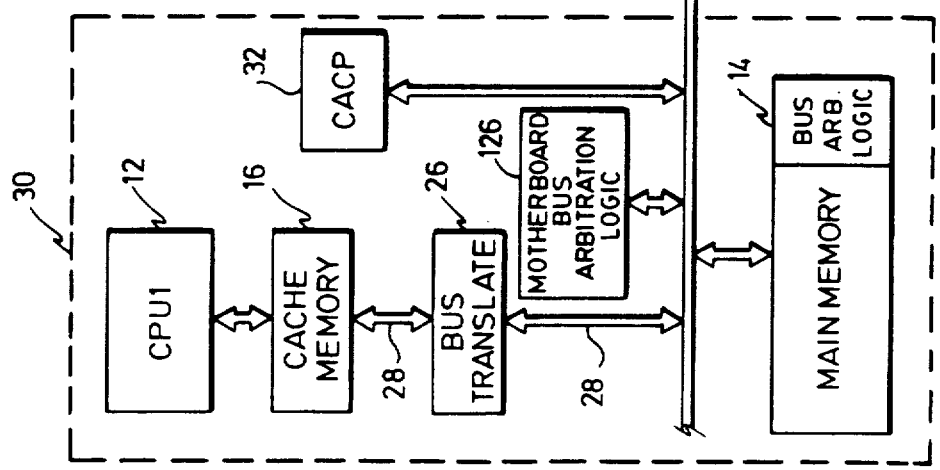
FIG. 6

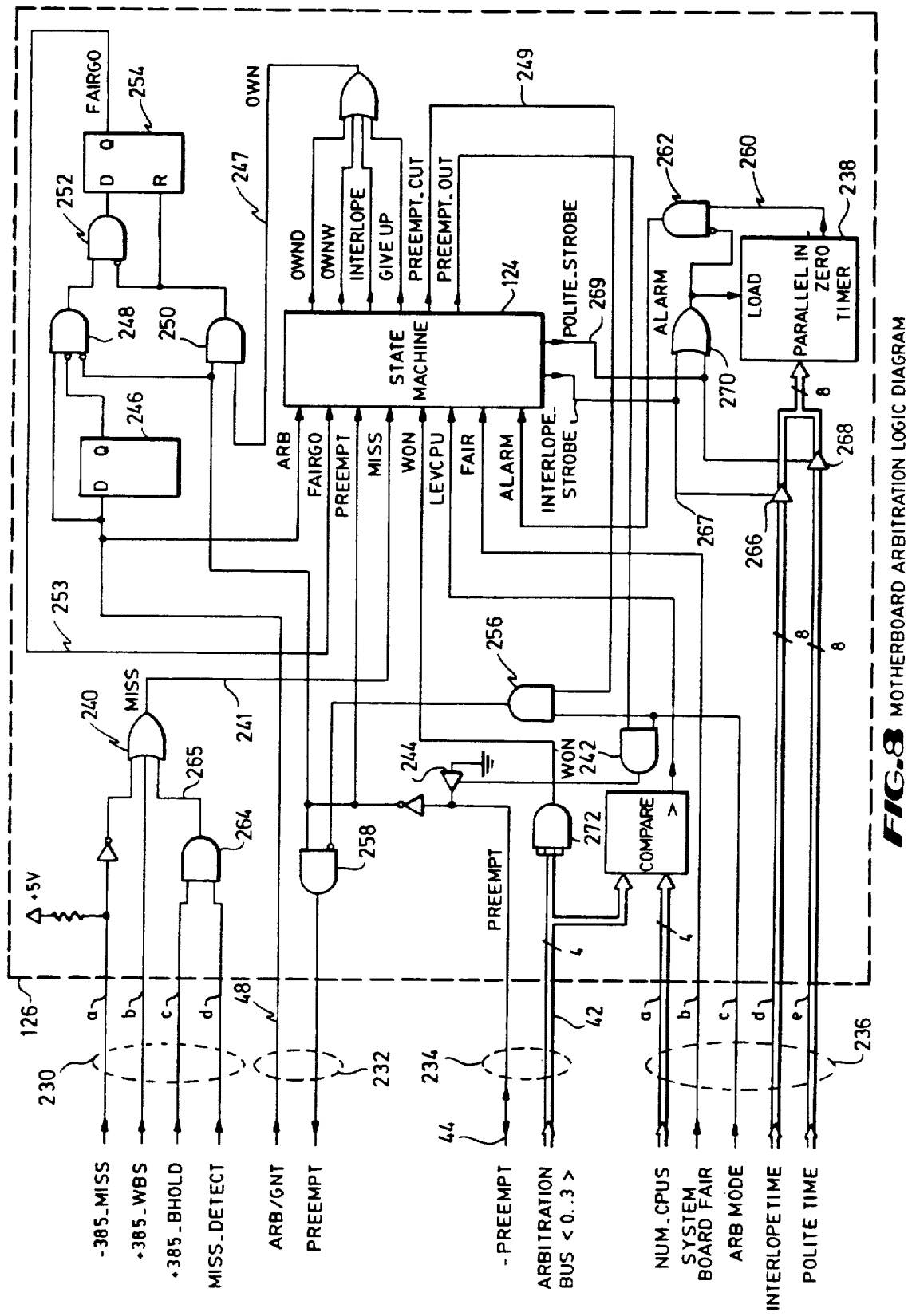
FIG. 8 MOTHERBOARD ARBITRATION LOGIC DIAGRAM

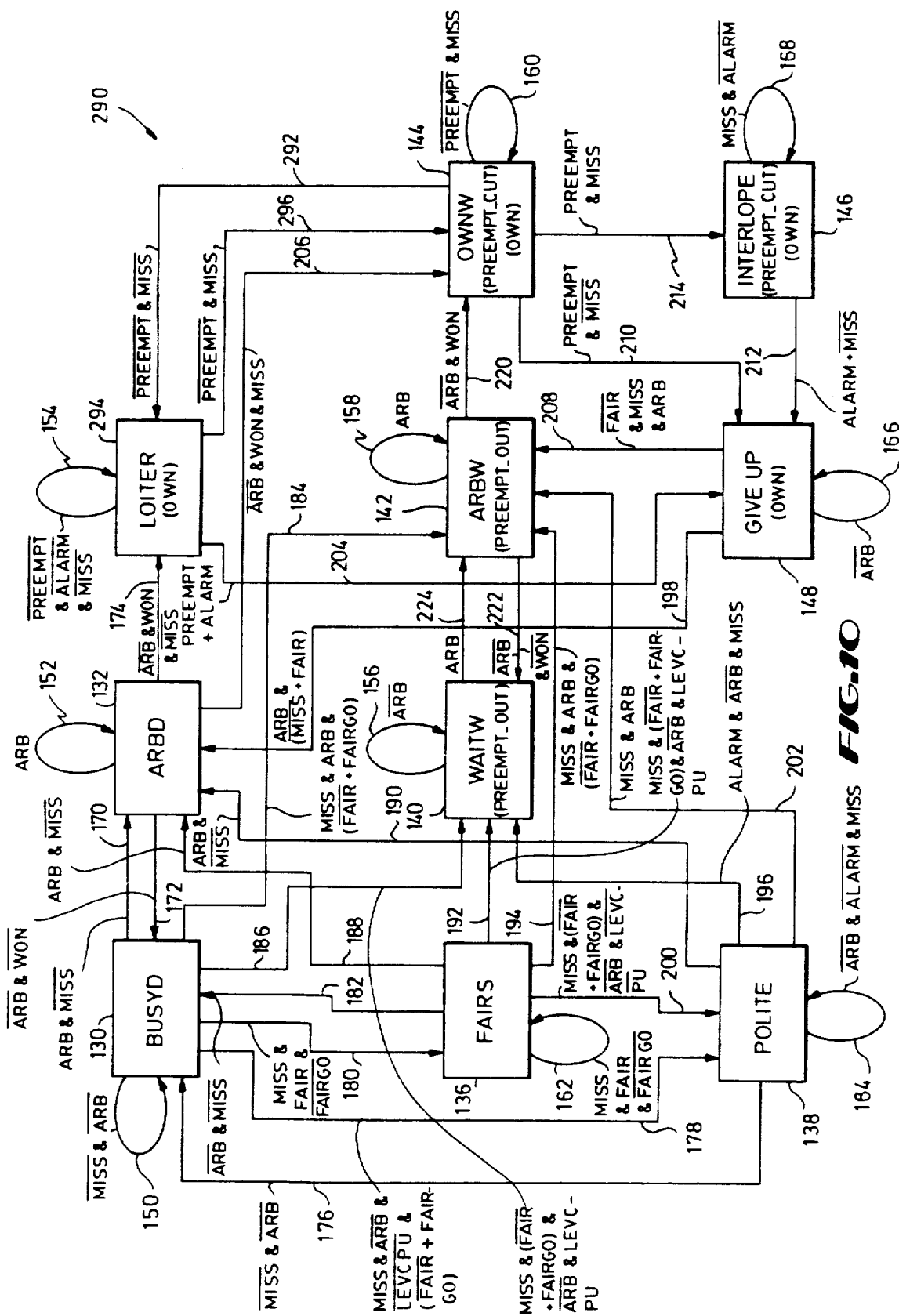

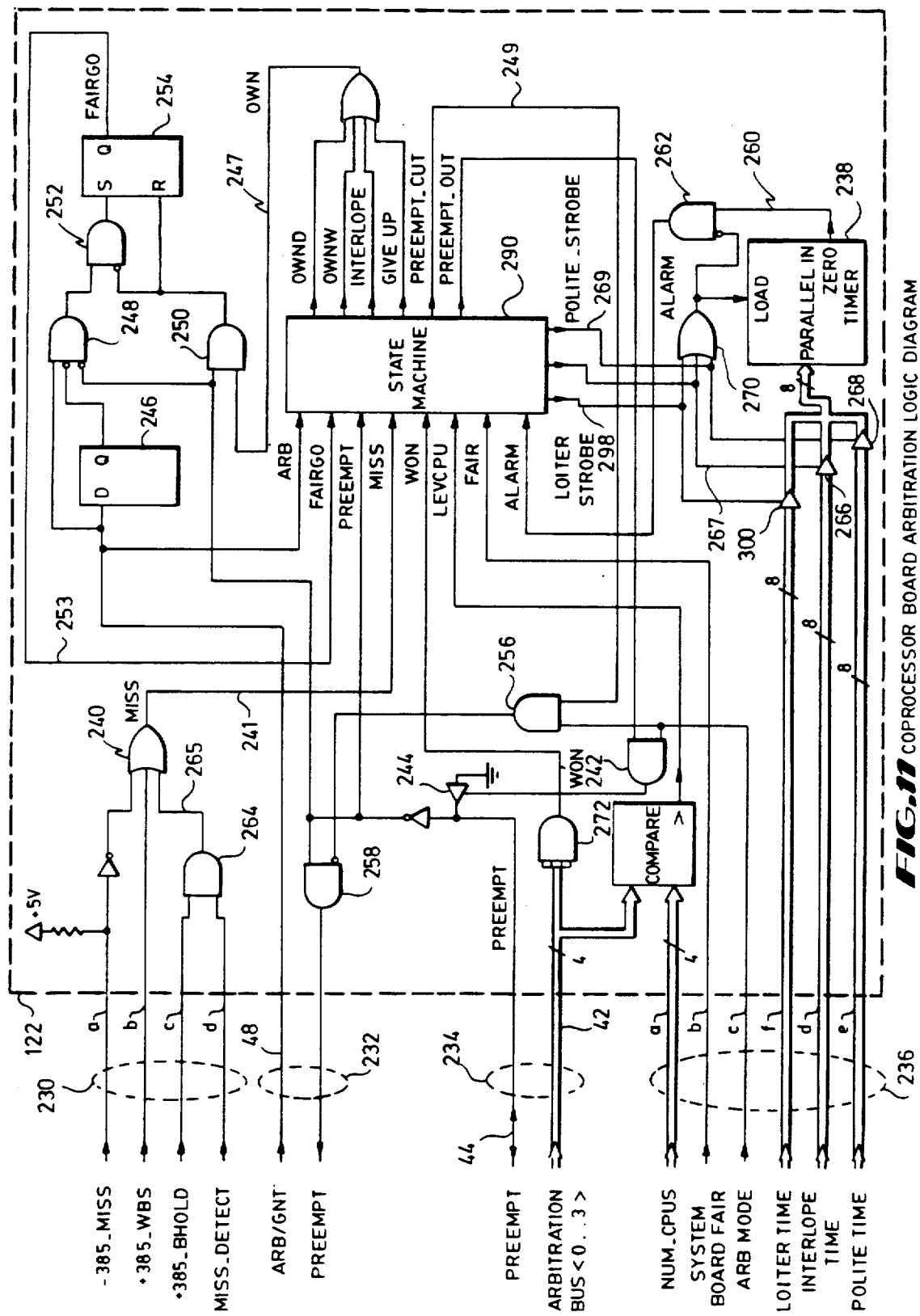

DELAYING ARBITRATION OF BUS ACCESS IN DIGITAL COMPUTERS

BACKGROUND OF THE INVENTION

This invention relates to digital computers, and more particularly relates to bus arbitration in computer systems which employ a plurality of processing units.

A digital computer consists of a set of functional components of at least three basic types: memory units, input/output (I/O) devices, and central processing units (CPUs). Memory modules typically consist of N words of M bits. Each word is assigned a unique numerical address (0, 1, . . . N-1). Memory words can be written or read by other modules in the system. I/O modules are functionally similar to memory modules, in that they can support both read and write operations. Disk drives, tape drives, printers, display screens, and modems are all examples of I/O devices which are controlled by an I/O module. Central processing units are typically the focal point of activity in a computer system. A CPU reads instructions and data from memory and I/O modules, performs logical or numerical manipulations on data as directed by instructions, and writes data to memory and I/O modules after processing. In addition, CPU modules may be used to control and synchronize the overall system operation, and can receive interrupt signals from other system components. As with memory and I/O modules, a computer system may include one or more independent CPU modules.

Practical and useful operation of a computer involves the communication of data and synchronization/control signals between all of the various components which comprise it. The collection of paths which logically connect the functional units of a computer together and enable the communication of information between them is called an interconnection structure.

An interconnection structure should be able to support information transfers which are included in any of the following categories:

Memory to CPU transfers: A CPU reads an instruction or data from memory

CPU to Memory transfers: A CPU writes data to memory

I/O device to CPU transfers: A CPU reads data from an I/O device

CPU to I/O device transfers: A CPU sends data to an I/O device

I/O device transfer to or from Memory: An I/O device exchanges data directly with memory, without going through the CPU (called Direct Memory Access or DMA)

In addition to supporting these transfers, the interconnection structure is commonly employed to carry control signals used to initiate the above transfers by the various functional units, and also to provide electrical power to the units.

The specific organization of an interconnection structure is a fundamental consideration in the design of computer systems, and a number of different implementation strategies exist in the art. The decision to employ a particular design approach depends on several factors, including the intended application of the system, the number and type of functional units that can be included in the system, and the performance characteristics desired of the system.

One of the most common interconnection strategies used in the design of both single and multiple processor computers is a "shared bus" architecture, in which the functional units of the system are connected by means of a common collection of conductive lines called a bus. In such an organization, only one module at a time can exert control over the use of a shared bus, and contention among the units which require the use of a bus must be resolved in some manner. With a centralized method of arbitration, a single hardware device, referred to as a bus controller, is responsible for allocating time on the bus among all units which may wish to use it. Alternatively, the synchronization and control logic associated with the use of a bus can be distributed equally among the various units which are interfaced to the bus, so that bus controller status can be transferred between many of the units in the system.

Whether a bus is implemented with a central control unit or with a distributed control arrangement, the implementation of a bus in a computer system can be additionally characterized by a number of other features. Of primary concern is the arbitration policy employed, which determines how access to the bus is obtained, particularly in the case that two or more units interfaced to the bus request access to the bus at once. An important feature of bus implementation schemes related to the arbitration policy is the synchronization mechanism, which defines how units interfaced to the bus request access to the bus. Another characteristic of a bus is its definition of information transfer protocols—the standardization of information transfer sequencing and formatting, so that the various units interfaced to the bus can appropriately interpret a variety of information carried on the bus lines. The definition of transfer protocols is closely related to the number and designation of the physical conductive lines which comprise a bus.

Many of the various techniques of bus arbitration known in the art can be broadly classified according to whether they employ a fixed or dynamic priority assignment among the units interfaced to a bus. In a fixed priority policy of arbitration, each unit that will participate in bus arbitration is assigned a certain priority level at start-up or configuration time. Whenever two or more units are in contention for use of the shared bus, access is unconditionally granted to the unit having the highest fixed level of priority. This approach is often implemented using a scheme called "daisy chaining," in which all units are assigned static priorities according to their locations along a common bus request line. Any unit which requires the bus asserts a request on the common request line. The bus arbitration mechanism polls each unit on the bus in order of priority until encountering a device which has requested use of the bus, and that device is granted access to the bus.

Although simple to implement, fixed priority arbitration schemes are often considered unacceptable, especially in multi-processor systems, since repeated bus access requests from a high-priority unit can prevent lower priority units from ever obtaining access to the bus. Such a condition is called starvation, and can occur in any scheme which involves a strictly static priority assignment. Static priority schemes are said to be non-symmetric, since they tend to favor certain arbitrating units (ones with higher priority) and neglect others.

In an arbitration scheme called fixed time slicing (FTS) or time division multiplexing (TDM), a static priority assignment is enhanced with a method for ensuring that no unit is starved. This is accomplished by dividing the available bus time into fixed-size intervals, and then sequentially offering these intervals to each device in a round-robin fashion in order of priority. Should a selected device not elect to use its time slice, the time slice remains unused by any device. This scheme exhibits the desired property of symmetry since no arbitrating unit is given preference over any other. Although the maximum wait time for access to the bus is bounded (hence no starvation), devices in an FTS scheme suffer from a generally high average wait time regardless of bus loading.

Dynamic priority assignments eliminate the problem of starvation by allowing the assignment of priority to change during the course of system operation. Dynamic priority schemes are said to be symmetric if the algorithm which determines the periodic reassignment of priorities does not tend to give preference to one particular arbitrating unit. A least-recently-used (LRU) algorithm, for example, gives the highest reassigned priority to that unit which has not used the bus for the longest interval. Another dynamic priority assignment scheme, called a rotating daisy chain (RDC), determines reassigned priority to each unit's distance from the winner of the previous arbitration.

One additional arbitration method, called first-come-first-serve (FCFS) arbitration, is not readily categorized as either a static or a dynamic priority scheme. With FCFS arbitration, requests are honored in the order received. FCFS arbitration is symmetric since it favors no particular processor, but is difficult to implement because the order of received bus requests must be recorded. Furthermore, in high bus load systems, two requests may arrive at the arbitration controller within a sufficiently small period of time that the arrival order cannot be precisely determined, leaving FCFS arbitration potentially vulnerable to starvation problems.

Since central processing units are usually the most active components in a computer system, systems which utilize a plurality of processors have an especially critical need for efficient allocation of bus access. In many configurations, two or more processing units share access to other system resources, including I/O devices and main memory, via the common system bus. During the execution of a single machine-level CPU instruction, a processor may need to make a large number of separate memory accesses (one for fetching an opcode, one or more for fetching operand specifiers, one or more for fetching operands, one or more for storing results). Contention for bus access among multiple processors can therefore be very pronounced, and may not be adequately resolved using a simple arbitration scheme.

Bus loading and contention can be significantly reduced by providing processing units with cache memories, making copies of recently accessed portions of the shared main memory available to the processors without using the system bus. The percentage of memory accesses which are successfully serviced by the cache without requiring a main memory access is called the cache "hit rate," and this rate is determined in part by the size of the cache, and the replacement policy employed by the cache. A cache hit rate of 90% can reduce the number of bus requests for each processor by a factor of ten. In the worst case, however, system performance may still be greatly diminished if two or more processors are repeatedly in contention for use of the bus. This is especially true if the process of arbitration itself consumes a large percentage of the processors' time, which could otherwise be spent performing useful computations.

Consider, for example, the case when two processing units, CPU1 and CPU2, each have several outstanding memory requests which cannot be serviced by their respective cache memories. If CPU1 has a higher static priority level than CPU2, CPU2 could remain unserviced for an unacceptably long period of time. Furthermore, even if the arbitration scheme provides a means for preventing CPU2 from being starved, so that CPU2 could interrupt CPU1's bus access, CPU1 could be allowed to immediately rearbitrate for bus access. Since CPU1 is assumed to have higher priority than CPU2, CPU1's request for bus access would then be granted, potentially interrupting CPU2's computational flow before it has satisfied all of its outstanding requests. CPU2 must then rearbitrate for bus access in order to resume processing. In this way, the two CPUs could prevent each other from operating efficiently, and both CPUs could spend a majority of their time participating in relatively unproductive arbitration. This undesirable phenomenon is called "thrashing," and, when unchecked, can occur in both static and dynamic priority arbitration schemes.

In response to the configuration and operational considerations discussed above, techniques of optimization based on these more subtle operational requirements can be employed within a given arbitration scheme. A bus implementation may, for example, selectively enforce preferential policies which take advantage of the variability of bus requirements or of computational abilities among the units to be interfaced to it, in order to decrease the overhead associated with arbitration or otherwise increase overall system performance.

It is accordingly an object of this invention to provide more efficient and equitable allocation of bus access among a variety of units which may be interfaced to the bus, and among the various modes of data transfer (ranging from standard programmed I/O to DMA) which the bus must support.

It is a further object of this invention to provide a flexible bus implementation which recognizes the special resource requirements associated with the inclusion of multiple processors within a computer system.

SUMMARY OF THE INVENTION

The bus implementation of the present invention can be generally described as having a distributed arbitration control mechanism involving an essentially fixed prioritization of arbitrating units. As suggested above, however, the implementation of the present invention includes the enforcement of several policies which obviate the problems of starvation and thrashing, and further enhance the efficiency of the overall system, particularly in the case that a plurality of processors are included in the system.

In a shared-bus computer architecture designed in accordance with one embodiment of this invention, contention for bus access is coordinated by logic associated with the bus itself (called the Central Arbitration Control Point or CACP), although the process of arbitration is carried out through the interaction of distributed logic included as part of each unit which may require bus access. A unit's logic hardware implements a state machine which specifies the behavior of that unit in obtaining and releasing bus access. In addition to an appropriate number of data, address and control lines in the shared bus, a system using this invention also includes in the bus a plurality N of lines collectively called the Arbitration Bus, as well as single bus lines called the Preempt line, the Burst line, and the Arbitrate line. N lines in the Arbitration Bus allow for $2^N$ unique priority levels to be represented on the bus.

Arbitration for bus access according to one embodiment of the present invention proceeds generally as follows: When a contending device wishes to obtain access to the shared bus, that device asserts the Preempt line on the bus, indicating to the CACP that an arbitration cycle should occur. When the current bus master relinquishes control of the bus, the CACP logic signifies using the Arbitrate line that an arbitration cycle for the bus shall occur in which all devices which have asserted Preempt can attempt to gain control of the bus. During the arbitration cycle, each contending device presents its priority level code on the Arbitration Bus. All arbitrating participants monitor the Arbitration bus as the lower priority participants withdraw their priority levels bit by bit from the Arbitration Bus, until only the priority code of the highest priority arbitrating participant remains. This device is denoted the winner of the arbitration cycle, and gains access to the bus as soon as the CACP deasserts the signal on the Arbitrate line.

Bus arbitration as just described is alone not sufficient, however, to resolve the contention resulting from the independent operation of two or more processors in a computer system. Assume, for example, that a first processing unit CPU1 is assigned the lowest arbitration priority, and that a second processor, CPU2 is assigned the second lowest arbitration priority. Under the scheme just described, CPU2 would be granted bus access only in the case that no other unit with a higher priority level has requested use of the bus. Furthermore, CPU1 would only gain access to the bus in the event that no other device with a higher priority has requested bus access, and that CPU2 had completely satisfied its need for the bus. This suggests that, without additional arbitration safeguards, CPU1 could easily be starved for bus access. In addition, once CPU1 was granted bus access, CPU2 would successfully preempt CPU1 immediately upon experiencing a cache miss. CPU1 would then need to rearbitrate for the bus before being able to proceed, and after regaining control of the bus would just as likely be interrupted again by CPU2 or another higher priority device.

In order to overcome this and other deficiencies in the known arbitration schemes in the art, a computer system employing one embodiment of the present invention prescribes the enforcement of several policies which affect an arbitrating participant's ability to request and obtain access to the bus.

The first of these policies is referred to as a "Fairness" protocol. Fairness is a global constraint enforced on all arbitrating devices which is aimed at preventing the starvation of lower priority devices due to requests from higher priority devices. Simply stated, the Fairness protocol stipulates that a device currently in control of the bus cannot participate in future arbitration cycles until an arbitration cycle passes in which no device requests bus access. Thus, in the case that a single high priority device and several lower priority devices are in contention for the bus, once the high priority device has been granted access for a first time, the lower priority devices are ensured of obtaining access to the bus during some upcoming arbitration cycle, since, under the Fairness protocol, the higher priority device cannot arbitrate for use of the bus until all lower priority requests have been satisfied, and an arbitration cycle passes in which no device has requested bus access.

Typically, processing units are given low arbitration priorities, since, as the more active components in a system, high priority processors would tend to starve lower priority devices of bus time. In fact, in single processor systems, the processing unit gets bus access only when no other system component requires bus access. In this case, the CPU is not even able to participate in bus arbitration, since it obtains bus access only by default. A second arbitration policy according to one embodiment of the present invention is employed in order to prevent a low priority CPU from thrashing with a high priority device. Thrashing occurs when a low priority device preempts a higher priority device before the higher priority device is able to complete the operations for which it requires the bus. This second arbitration policy, called "Politeness" requires that the low priority CPU wait for a certain amount of time, called the "polite delay time" before preempting the higher priority (nonCPU) device. In this way, the higher priority device is more likely to be finished with the bus by the time it is preempted, and is therefore less likely to immediately thereafter preempt the low priority device.

A third policy, called "Loitering," employed in an embodiment of the invention, is a protocol useful in reducing the amount of arbitration occurring during periods of low bus activity. In the event that a CPU has control of the bus, but neither that CPU or any other device wishes to obtain access to the bus, the loitering protocol specifies that the controlling CPU remain in control of the bus for a predetermined "loiter delay time." In this way, if the controlling CPU finds during the loiter delay time that it again requires the use of the bus, it does not have to re-arbitrate in order to have control of the bus.

A final policy enforced under the protocol of one embodiment of the invention enables a bus implementation to recognize the unusually great bus requirement of processing modules. This policy, called an "Interlope" protocol, allots several bus cycles to a CPU during periods of heavy bus activity. Assuming that a CPU currently has control of the bus, and that another CPU has asserted the Preempt line indicating its desire to obtain bus access, the interloping protocol allows the first CPU to remain in control of the bus for an additional, predetermined period called the "interlope delay time" before releasing the bus for a new arbitration cycle.

BRIEF DESCRIPTION OF DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 3 is a logic diagram of arbitration logic included in the components of the system of FIG. 1;

FIG. 4 is a state diagram describing the behavior of components in the system of FIG. 1;

FIG. 5 is a state diagram describing an alternate mode of behavior of components in the system of FIG. 1;

FIG. 6 is a block diagram of a computer system designed in accordance with the present invention;

FIG. 8 is a logic diagram of the motherboard bus arbitration logic in the system of FIG. 6;

FIG. 10 is a state diagram describing the behavior of coprocessor boards in the system of FIG. 6; and FIG. 11 is a logic diagram of the coprocessor board bus arbitration logic in the system of FIG. 6.

DETAILED DESCRIPTION OF A PREFERRED EMBODIMENT

Although the present invention can be applied to any computer system which supports a plurality of processing units in addition to a typical complement of I/O devices and memory facilities, a preferred embodiment is realized by implementing the invention as hereinafter described.

Figure 1:
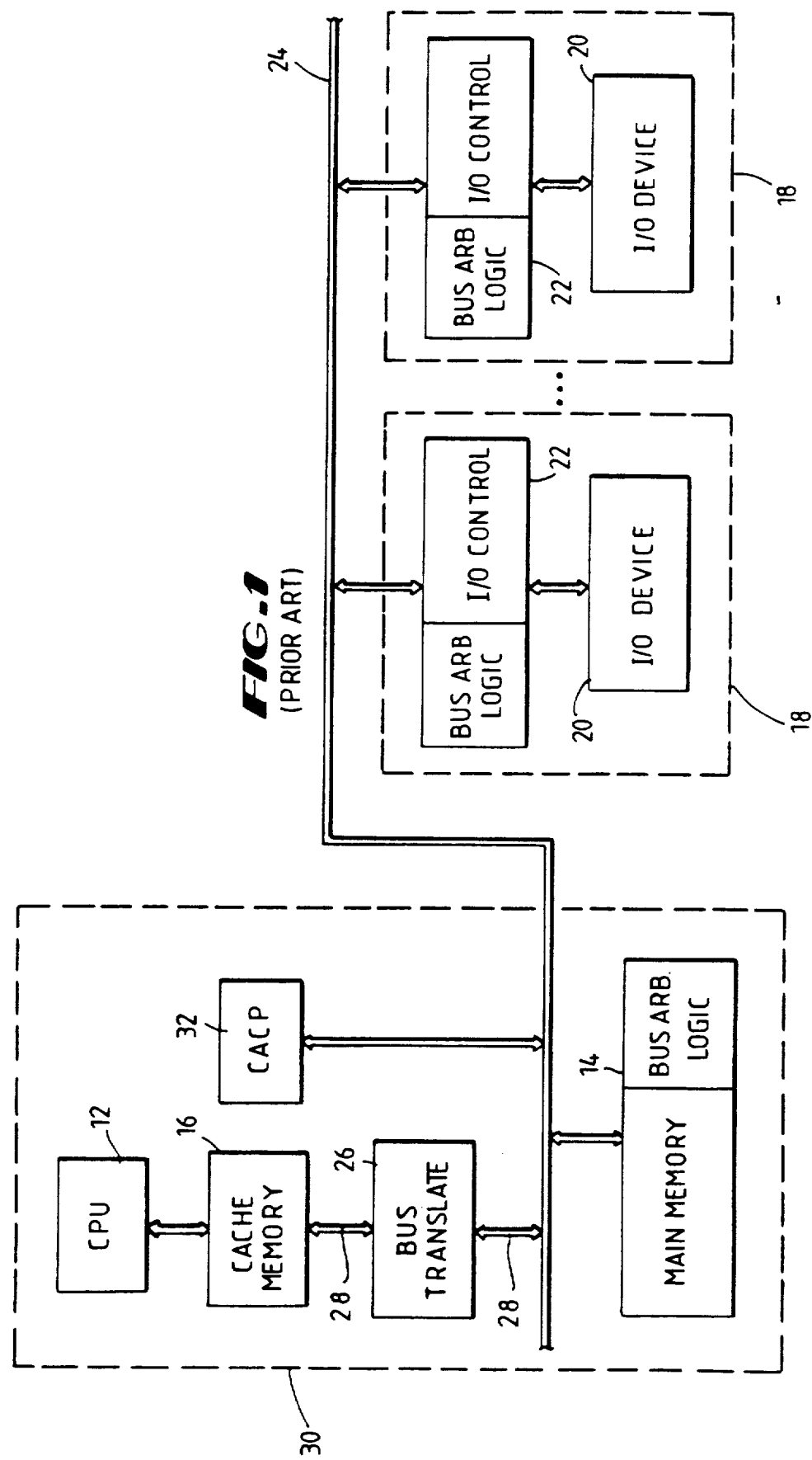
FIG. 1 is a block diagram of a single processor shared bus computer system.

FIG. 1 shows a simplified block diagram of a computer system which forms the basis of the preferred embodiment, and which is comprised of a plurality of functional components, including:

- A central processing unit 12 which performs arithmetic and logical computations on data in memory as instructed by machine level instructions also contained in memory.
- A main memory unit 14 that holds the instruction and data information used by the CPU 12.
- A cache memory unit 16 associated with the processing unit 12 which provides fast access to a copy of a subset of main memory locations without requiring access to the main memory 14.
- A plurality of input/output (I/O) modules 18 which may provide additional means for storage of instruction and data information used by the processing units, and which may also provide means of communication between the computer system 10 and a user of the system. Each I/O module 18 consists of an I/O device 20, and an associated I/O controller 22 which controls the communication of information between the I/O devices 18 and either the CPU 12 or main memory 14.
- A shared bus 24 which serves as the interconnection structure that carries digital information between the other functional components 14, 16, 18 of the computer system of FIG. 1.
- A translation module 26 which acts as a protocol interface between the CPU's local bus 28 and the shared bus 24. The translation module 26 translates outgoing information on a local bus 28 into a format which conforms to the protocol specified in the implementation of the shared bus 24, and similarly translates incoming information on the shared bus 24 into a format appropriate for the local bus 28 of the associated processing unit 12.

In a preferred embodiment, the processing unit 12, its cache memory 16, a portion of the shared system bus 24, and the main memory unit 14 are located on a common circuit board 30 called the motherboard. The motherboard 30 additionally holds bus arbitration control logic called the central arbitration control point (CACP) logic 32 which coordinates the arbitration of bus accesses requested by contending modules, such as the I/O modules 18 or the main memory module 14.

The system configuration shown in FIG. 1 is a typical arrangement for single processor systems, and a variety of known arbitration schemes can be used to resolve conflicts for bus access among the system components. One such scheme is specified in the so-called "Micro Channel Architecture" or MCA.

Figure 2:
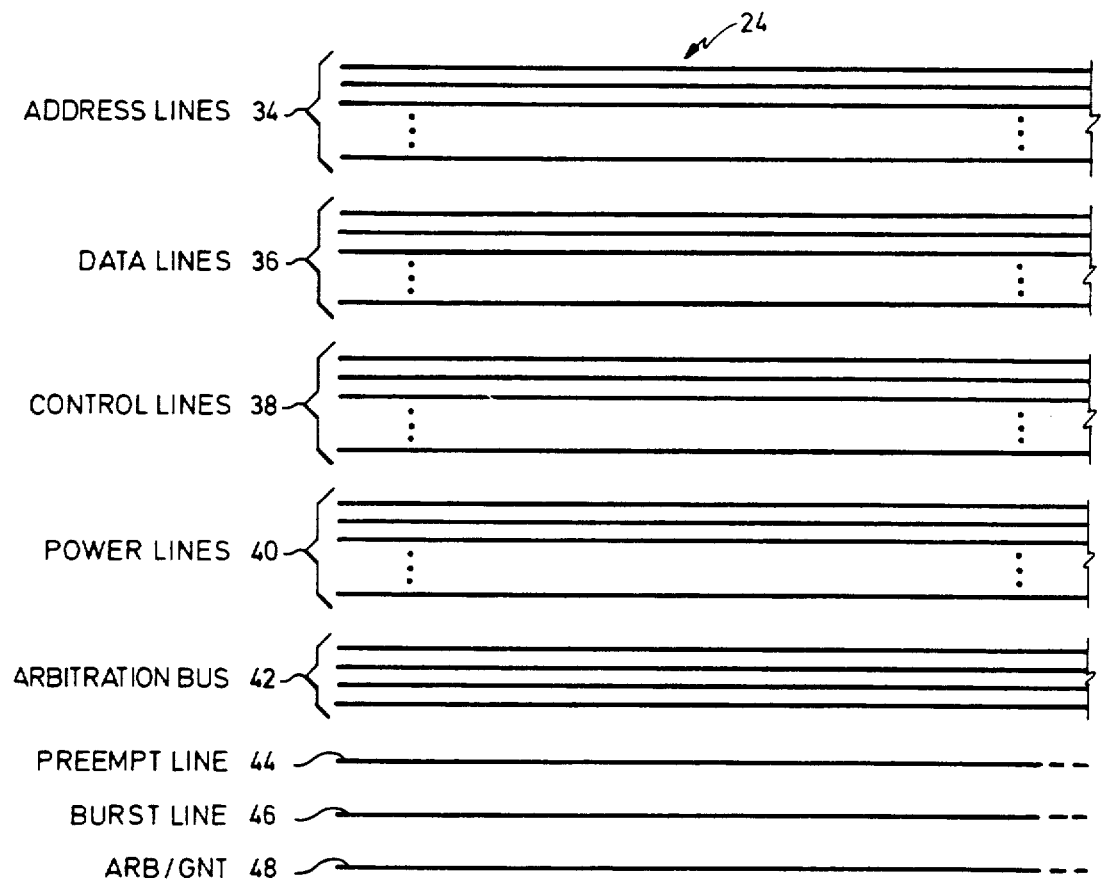
FIG. 2 is a detailed view of the shared bus in the system of FIG. 1.

FIG. 2 is a detailed view of the shared MCA system bus 24 of the preferred embodiment. One group 34 in the bus 24 consists of thirty-two address lines A0 through A31 used to address memory 14 and I/O devices 18 interfaced to the bus 24. These lines 34 allow access to four gigabytes of uniquely addressed memory locations. Thirty-two data lines 36 carry the binary data transferred between the various components of the system. A plurality of control lines 38 are used to communicate information about the kinds of transfers taking place on the bus, for synchronization of communication between devices, for indicating the status of various system components, for indicating the validity or invalidity of data and addresses on the bus, for detecting and correcting errors in data transfer, for initiating an interrupt of the CPU to service exceptional conditions, and for supporting various other specialized functions on the bus, like DMA. A plurality of power lines 40 provide a common power supply and electrical grounding points to devices interfaced to the bus 24.

In addition to this collection of address, data and control lines, MCA incorporates additional lines in the shared system bus 24, used for supporting the MCA bus arbitration scheme. Four of these additional lines are collectively called the arbitration bus 42, used by each contending device to carry its statically defined arbitration priority levels, as hereinafter described. Four lines in the arbitration bus 42 allow the system to support sixteen devices with unique arbitration priorities. The highest binary value $(1111)_2$ of the arbitration bus 42 has the lowest priority, and the lowest value $(0000)_2$ has the highest priority.

Another line included in the system bus 24 is called the preempt line 44, used to signal to the CACP 32 that one or more devices are requesting access to the bus. A burst line 46 is used by the device currently in control of the bus to indicate that the device will require several consecutive bus cycles to transfer a block of data (rather than just a single cycle to transfer a single word) before its bus needs will be satisfied. Finally, as arbitrate/grant (arb/gnt) line 48, controlled by the CACP 32, is also included in the shared bus. The arb/gnt line 48, when asserted (high), informs each component in the system that an arbitration cycle is taking place, so that any device which requires the bus can participate in the arbitration. When deasserted (low) the arb/gnt line 48 indicates to each component in the system that access to the bus has been granted to the device whose priority level currently appears on the arbitration bus 42.

Arbitration according to MCA proceeds as follows: Whenever a device requires the use of the shared system bus 24, that device asserts the preempt line 44. The preempt line 44 is driven by open-collector drivers, so that at any given time, the level on the preempt line 44 reflects the OR-ing of the preempt lines of all devices in the system. When one device asserts preempt, each device in the system sees the preempt line 44 asserted. The CACP 32 responds to an asserted preempt line 44 by driving the arb/gnt line 48 high, beginning the arbitration cycle.

When contending devices see the arb/gnt line 48 go high, each one that requires use of the bus drives its arbitration priority level on the four arbitration bus lines. A portion of the bus arbitration logic included in each system component is responsible for detecting the high arb/gnt line and then driving the contending unit's priority level on the common arbitration bus 42. Since the arbitration bus lines are also driven by open-collector drivers, (like the preempt line 44), the arbitration logic can determine whether a device with a higher priority is also driving the arbitration bus 42. Devices respond to the detection of higher priority arbitrating devices by removing (bit by bit) their own values from the arbitration bus lines, until only one device (the one with the highest priority) is left driving the arbitration bus 42. Thus, after a short "settling time" following the beginning of an arbitration cycle, the winner of the arbitration (the device whose priority level remains driven on the arbitration bus 42) is determined. The CACP marks the end of the arbitration cycle by once again driving the arb/gnt line 48 high. The winner is then left in control of the system bus 24, and losing devices are forced to wait until the next arbitration cycle before competing for access to the bus 24.

The logic included with each arbitrating device that is responsible for driving the arbitration bus is called a "local arbiter". FIG. 3 shows a simplified logic diagram of a local arbiter 50 as implemented in an MCA system. An arbitrating device competes for control of the system bus 24 after asserting preempt line 44 and the CACP 32 drives arb/gnt line 48 to the arbitrate level (high). The competing local arbiters of FIG. 3 drive their assigned arbitration levels onto the arbitration bus lines and each one compares its arbitration level with the arbitration bus lines on a bit-by-bit basis beginning with the most significant bit line, ARB3. If a competing local arbiter of FIG. 3 detects a mismatch on one of the bits, it should cease to drive all lower-order bits immediately. The mismatch in the highest order bit of the local arbiter is detected by using the output of the first NAND gate 52 as one input to the first OR gate 54, whose other input is the most significant bit of the corresponding device's assigned priority level. Notice that the value of the ARB3 line may be 'zero' even if the NAND gate 52 is driving a 'one' on that line, since with open collector drivers, the ARB lines will be 'zero' if any arbiter in the system is driving 'zero' on them. Thus, if the value on the ARB 3 line does not match the value being driven by the local arbiter 50, the output of OR gate 54 will be 'zero', causing the outputs of all subsequent NAND gates 56, 60, 64, and AND gate 68 to be disabled.

If, on the other hand, the ARB3 value matches the assigned value being driven by the local arbiter 50, the output of the OR gate 54 will be a 'one', and the NAND gate 56 will drive the second bit (bit 2) of the assigned arbitration level on line ARB2. This output is fed back to be an input to OR gate 58, which 'compares' the value of ARB2 to bit 2 of its assigned priority level. A mismatch in OR gate 58 would cause NAND gates 60, 64 AND gate and 68 to be disabled, while a match would enable these gates. This process is repeated for bits 1 and 0 of the arbiter 50, until either all ARB lines match, or none are driven by the arbiter. If all lines match, the output of AND gate 68 (called the "won" signal) will indicate to the competing device at the end of the arbitration cycle that its priority level is the one that appears on the arbitration bus 42.

FIG. 4 shows a state diagram which describes the behavior of devices in a system which employs MCA arbitration. In the diagram of FIG. 4, the set of nodes 70, 72, 74 represent all possible states of operation in which a device interfaced to the system bus 24 can be engaged. State 70 is the BUS BUSY state where devices stay when they either do not currently require the bus or have lost the latest arbitration cycle. State 72 is the ARBITRATE state which all devices enter when the CACP 32 begins an arbitration cycle by asserting the arb/gnt line 48. State 74 is the GO state which is entered only by the winner of an arbitration cycle when it gains access to the bus 24.

The directional paths 76, 78, 80, 82, 84, 86, 88 connecting the nodes 70, 72, 74 in FIG. 4 represent the only possible state transitions that a device can make, and these paths are labelled with the logical conditions necessary to cause and allow the corresponding transitions. The definitions of the logical conditions are as follows:

preempt: the preempt line in the bus has been asserted by some device arb: the CACP 32 has asserted (high) the arb/gnt line indicating the occurrence of an arbitration cycle won: the "won" signal of a device's local arbiter 40 has been asserted, indicating that the device has the highest priority of all devices which participated in arbitration Note that in the state diagram of FIG. 3, a bar over a condition indicates the negation of the condition (e.g., $\overline{won}$ implies "not won" or "lost").

During an arbitration cycle (i.e., when the arb/gnt line 48 is asserted (high), each device which has asserted the preempt line 44 to request access to the bus is in the ARBITRATE state 72. As long as the CACP 32 indicates on the arb/gnt line 48 that an arbitration cycle is taking place, devices in the ARBITRATE state 72 will follow the "self loop" path 78 and will remain in the ARBITRATE state 72 until the CACP 32 indicates on the arb/gnt line 48 that the arbitration cycle is over. When the arbitration cycle has terminated, all but one of the contending devices will "lose" the arbitration and thus move to the BUS BUSY state 70 along path 84. The "winner" of the arbitration cycle (the device whose arbitration priority remains on the arbitration bus 42 after arb/gnt 48 is deasserted (high)) will make the transition along path 86 and enter the GO state 74. A device in this state is in control of the bus, and will follow the "self loop" path 80 to remain in control of the bus until another device in the system 10 asserts the preempt line 4. Only one device will ever be in the GO state 74 at any given time since only one device can "win" an arbitration cycle to satisfy the conditions on path 86 into this state.

When a device in the GO state 74 sees that another device has asserted the preempt line 44, the condition on path 88 becomes true, and the device in control of the bus will enter the BUS BUSY state 70. As long as the CACP 32 does not assert the arb/gnt line 48 to start an arbitration cycle, the device in control of the bus 24 will follow "self loop" 76 to remain in the BUS BUSY state 70. Likewise, devices which were not in control of the bus 24 will also wait for the next arbitration cycle in the BUS BUSY state 70 following "self loop" 76.

When the CACP 32 responds to an asserted preempt line 44 by asserting the arb/gnt line 48, all devices in the system 10 enter the ARBITRATE state 72 via path 82.

Each device will remain in this state 72 (by following "self loop" 78) until the arbitration cycle terminates. During this time, devices which have requested access to the bus 24 will participate in the arbitration by driving their priority levels on the arbitration bus 42 as described above. At the end of the arbitration cycle, "losing" devices return to the BUS BUSY state 70 along path 84, and the "winning" device enters the GO state along path 86.

Often, computer systems utilize dynamic RAM memory devices which must be periodically refreshed in order to retain stored information. Since the shared system bus 24 is required in order to perform this refreshing. the MCA implementation imposes the constraint that no device remain in control of the bus 24 for more than the maximum refresh cycle time of the dynamic memory, typically ten to fifteen microseconds. After this time, the CACP 32 forces a preempt of the controlling device and initiates an arbitration cycle. The actual refreshing of dynamic memory occurs during the arbitration cycle, and at the end of the arbitration cycle a new device gains control of the bus 24.

In the single processor system 10 of FIG. 1, all non-CPU devices include logic which enable them to participate in the arbitration scheme described above. Typically, however, the processing unit 12 itself is not allowed to participate in arbitration, but rather has control of the system bus 24 only when no other device in the system is using it. If a device in the GO state 74 satisfies its current bus requirements, it will nonetheless remain in control of the bus until it is preempted. If no other device requires the bus, the device in control of the bus will be in control until the CACP 32 forces a preempt for the refreshing of memory. If no device has yet requested the bus 24 by the time the resulting arbitration cycle is terminated (and the refreshing of memory is complete), control of the bus 24 will be given, by default, to the CPU 12 on the motherboard 30.

The MCA system of the preferred embodiment supports an additional arbitration feature not revealed in the state diagram of FIG. 4. An optional "Fairness" protocol can be enabled which allows each device a more equitable share of access to the shared bus 24. If "Fairness" is active and an arbitrating device that currently controls the bus 24 is preempted, the device enters an inactive state and must wait for an arbitration cycle to pass in which no other device requests and gains access to the bus 24. FIG. 5 shows the state diagram describing the behavior of arbitrating devices in the system 10 wherein the "Fairness" policy is enabled. A device leaving the GO state 94 as a result of a preempt from another device enters the FAIR state 96 via path 110. A device in the FAIR state 96 will remain there (by following "self loop" 112) until it sees the preempt line 44 deasserted. Only after the transition from the FAIR state 96 to the BUS BUSY state 90 via path 114 can a device that has just relinquished bus control be allowed to participate in arbitration. This allows the system to service all arbitrating devices in order of priority before the same device can regain control of the bus 24.

FIG. 6 shows a computer system which includes all of the components included in the system 10 of FIG. 1, wherein identical components have retained the same reference numerals. In addition, however, the system of FIG. 6 includes a second processor module (coprocessor) circuit board 120 not present in the system of FIG. 1. As with the processor module on the motherboard 30, the coprocessor module 120 is comprised of a central processing unit 12a, a private cache memory unit 16a, and translation logic 26a which functions as the protocol interface between the shared system bus 24, and the local processor bus 28a. The coprocessor board 120 further includes bus arbitration logic 122 which allows the coprocessor board 120 to share system resources (I/O devices 18, main memory 14) via the system bus 24.

In the system of FIG. 1, the processor on the motherboard 30 was not able to participate in arbitration for the bus 24, but was granted bus access only by default, when no other device required access. The addition of a coprocessor 120 in the system of FIG. 6, however, renders the arbitration scheme represented by the state diagram of FIG. 5 inadequate for ensuring fair allotment of bus access to all competing devices. Referring to FIG. 6, if neither CPU 12 nor 12a is permitted to arbitrate for bus access, one CPU would be given access to the bus 24 by default, while the other would never gain access to the bus 24. If only one of the processors 12 or 12a is permitted to arbitrate for the bus 24 and the other is not, the non-arbitrating processor would likely receive insufficient bus access due to the high requirements of the processor which is allowed to arbitrate. A similar problem arises if both processors are allowed to arbitrate for bus access, since the static assignment of arbitration priority levels would cause the CPU with the higher priority to dominate over one with lower priority. These problems become further pronounced in the case that a plurality of coprocessors like the coprocessor 120 in FIG. 6 are added to the system in FIG. 1. The present invention specifies enhancements to the existing arbitration scheme of MCA systems which allows for efficient and equitable bus allocation in the system of FIG. 6, or in a similar system with multiple processors.

According to the present invention, all devices in the system of FIG. 6, including the motherboard processor 12 and the coprocessor 12a, are allowed to participate in arbitration for bus access. Due to the extensive bus requirements of processor modules, the processors 12 and 12a are assigned the lowest levels of arbitration priority, so that less demanding devices are not starved. This implies that arbitration logic 126 must be included on the motherboard 30, since the motherboard 30 was unable, in the system of FIG. 1, to participate in bus arbitration. In addition, the arbitration logic associated with each arbitrating device is modified in order to support additional behavioral protocols in accordance with this embodiment of the present invention.

The first modification to the MCA arbitration scheme necessary for multiple processor arbitration is the implementation of a policy called "Politeness" which is aimed at preventing a CPU from thrashing with a high priority device. Suppose, for example, that a CPU preempted a high-priority device before that device had satisfied its current bus requirements. System performance in this case would suffer, since the high priority device would not, according to the policy of "Fairness", be allowed to rearbitrate for the bus until the CPU had relinquished the bus, and an arbitration cycle had passed in which no other device requested the bus. The policy of "Politeness" stipulates that the CPU not be allowed to preempt a high priority, non-CPU device until after a certain delay time, called the "polite delay time," in order to give the high priority device a better chance of satisfying its bus needs. In this way, the time the high priority device would have been forced to spend waiting to rearbitrate for the bus before completing its transaction is eliminated.

A similar enhancement to the MCA arbitration scheme is an "Interlope" policy which allows a CPU to have more bus time during periods of heavy bus activity than under the conventional MCA scheme. Just as the "Politeness" delay gave a high priority device a longer time to complete its bus transaction, the "Interlope" policy allows a CPU to delay relinquishing the bus for a certain delay time, increasing the likelihood that the CPU can satisfy its current bus needs without having to rearbitrate for the bus. According to the "Interlope" policy, if a device asserts preempt before a CPU in control of the bus has finished using the bus, the CPU is allowed to continue controlling and using the bus for a predetermined "interlope delay time" before releasing the burst signal.

A final enhancement to the existing MCA arbitration scheme is useful for eliminating unnecessary arbitration cycles when bus activity is light. Since disk drives and other I/O devices are commonly involved in block transfers of data, such devices are more able to predict their future bus requirements than are CPUs, which are typically unaware of what operation they will perform next. The "Loiter" policy of the present invention enables a CPU to extend its control of the bus (for a period of time called the "loiter delay time") after it has satisfied its current bus requirements, if no other device has requested the bus. During the loiter delay time, the CPU might be able to service new and unexpected bus needs which arise after it would have otherwise relinquished the bus. By avoiding arbitration cycles in which there would be no contention for the bus, unnecessary arbitration cycle time is reduced.

The policy of "Fairness" is enforced upon all arbitrating components in the system of FIG. 6. The "Interlope" and "Politeness" policies, however, are directed toward delaying certain activities of the CPUs 12 and 12a, and are therefore implemented only in the logic which controls the behavior of these components. Although the motherboard CPU 12 is able, according to this embodiment of the present invention, to arbitrate for bus access, it also is granted access to the system bus 24 by default, when no other device in the system requires the bus 24. For this reason, the "Loitering" policy is implemented only on the coprocessor board 120, and not on the motherboard 30.

Figure 7:
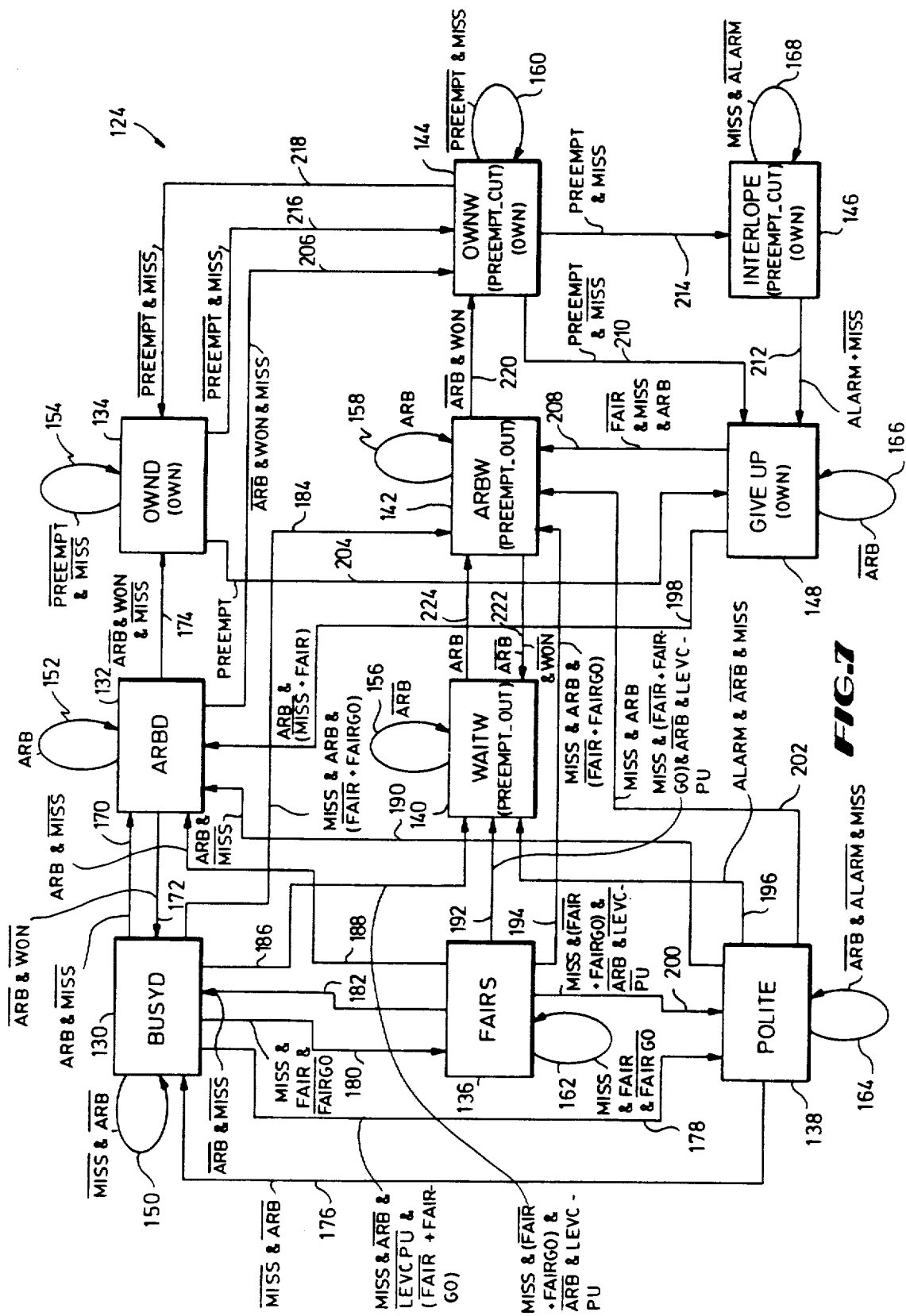
FIG. 7 is a state diagram describing the behavior of the motherboard in the system of FIG. 6.

FIG. 7 is a state diagram of the state machine 124 which defines and describes the arbitration behavior of the motherboard processor 12 in the system of FIG. 6. The following is a summary of the states which appear in the state machine 124.

BUSYD 130: This state corresponds to the case that the motherboard processor 12 does not own the bus 24, and the motherboard processor 12 does not need the bus 24.

ARBD 132: This state corresponds to the case that the bus 24 is currently involved in an arbitration cycle, and the motherboard processor 12 does not need the bus 24.

OWND 134: This state corresponds to the case that the motherboard processor 12 owns the bus 24, but it does not need the bus 24.

FAIRS 136: This state corresponds to the case that the motherboard processor 12 does not own the bus 24, and it needs the bus 24. The motherboard processor 12 does not assert preempt in this state, however, because it is not allowed to according to the "Fairness" policy.

POLITE 138: This state corresponds to the case that the motherboard processor 12 does not own the bus 24, and it does need the bus 24. Furthermore, the motherboard processor 12 is allowed to assert preempt under the "Fairness" policy, but it does not assert preempt because a non CPU device currently owns the bus 24. Preempt will be asserted only after a "polite delay time."

WAITW 140: This state corresponds to the case that the motherboard processor 12 does not own the bus 24 and it does need the bus 24. In this state, the motherboard processor 12 is asserting preempt and is waiting for an arbitration cycle.

ARBW 142: This state corresponds to the case that the system bus 24 is currently involved in an arbitration cycle and the motherboard processor 12 needs the bus 24. In this state, the motherboard processor 12 is asserting preempt.

OWNW 144: This state corresponds to the case that the motherboard processor 12 owns the bus 24 and needs the bus 24. When the motherboard processor 12 is in this state, the preempt signal into the motherboard 30 from the system bus 24 is disabled.

INTERLOPE 146: This state corresponds to the case that the motherboard processor 12 owns the bus 24, and it is using the bus 24 (needs the bus). In addition, the preempt signal has been asserted by another device on the bus 24. In this state, the preempt signal to the motherboard processor 12 is disabled for the duration of the "interlope delay time."

GIVEUP 148: This state corresponds to the case that the motherboard processor 12 owns the bus 24 but does not need the bus 24. If the motherboard 30 is in this state, it has either just been preempted and did not interlope (since it did not need the bus 24), or it has been preempted and has already waited for the duration of an "interlope time delay."

The logical conditions that are used to label the directional paths 150 through 218 corresponding to valid state transitions are defined as follows:

fair: This condition is a system configuration option which determines whether the motherboard CPU 12 conforms to the "Fairness" policy.

miss: This condition is taken from the output of miss detector circuitry on the motherboard 30 which determines when the CPU 12 requires access to the bus.

alarm: This condition is taken from the output of a delay timer that is active when the timer value has reached zero.

won: This condition is asserted by the CACP 32 whenever the arbitration bus 42 carries the value (1111)2, corresponding to the case that the motherboard processor 12 has won the latest arbitration.

levcpu: This condition is asserted by the CACP 32 whenever the value on the arbitration bus 42 is numerically greater than or equal to that of the CPU device on the system bus 24 that has the highest arbitration priority. This signal is used to determine whether the current owner of the bus 24 is a CPU or a non-CPU device.

arb: This condition is taken from the arb/gnt line 48 of the system bus 24. (This signal should always be asserted/deasserted one clock cycle prior to the assertion/deassertion of the arb/gnt line 48).

fairgo: This condition is active when the motherboard processor 12 is allowed to assert preempt under the "Fairness" policy.

Recall that a bar over a logical condition indicates the logical negation of that condition.

Motherboard Arbitration Behavior:

Referring to FIG. 7, the activity of the motherboard 30 in the system of FIG. 6 proceeds as hereinafter described. Assume that the motherboard 30 starts out in the BUSYD state 130. As long as the motherboard does not require the bus 24 (miss) and no arbitration is taking place (arb), the motherboard 30 will stay in the BUSYD state 130 by following "self loop" 150 in each machine cycle. From here, if an arbitration cycle is initiated (arb), but the motherboard 30 still does not need the bus 24 (miss), the motherboard 30 will move from the BUSYD state 130 to the ARBD state 132 via path 170. As long as the arbitration cycle continues (arb), the motherboard 30 will remain in the ARBD state 132 by following "self loop" 152. If the arbitration cycle terminates (arb) and the motherboard 30 is not declared the winner (won), the motherboard 30 will return to the BUSYD state 130 via path 172. If, on the other hand, the arbitration cycle terminates (arb) and the motherboard 30 is declared the winner (won) by default (recall that in this case the motherboard 30 did not request the bus 24), then the motherboard will enter the OWND state 134 by way of path 174.

Once in the OWND state 134, the motherboard 30 will remain here as long as it is not preempted (preempt) and continues not to want the bus 24 (miss), by following "self loop" 154. If the motherboard 30 is in the OWND state 134 and discovers that it does want the bus (miss), it enters the OWNW state 144 via path 216. If the motherboard 30 is in the OWND state 134 and is preempted (preempt) before requiring the bus itself, it will follow path 204 to enter the GIVEUP state 148. The motherboard 30 waits in the GIVEUP state 148 for an arbitration cycle by following "self loop" 166. If an arbitration cycle is initiated before the motherboard 30 finds that it needs the bus 24 (miss), or if an arbitration cycle is initiated and the motherboard 30 wants the bus 23 (miss) but is conforming to the fairness policy (fair), then motherboard 30 enters the ARBD state 132 again, via path 198. If the motherboard 30 is in the GIVEUP state 148, does want the bus 24 (miss), and is not conforming to the fairness policy (fair), then the initiation of an arbitration cycle (arb) will cause the motherboard 30 to enter the ARBW state 142 along path 208.

As long as an arbitration cycle is occurring (arb) and the motherboard is in the ARBW state 142, it will remain in this state by following "self loop" 158. When the arbitration cycle terminates (arb), the motherboard will either be the winner (won)a nd enter the OWNW state 144 via path 220, or it will not be the winner (won) and will enter the WAITW state 140 by following path 222.

In the case that the motherboard 30 wins an arbitration cycle (won) and enters the OWNW state 144, it will stay in this state and in control of the bus 24 (own) for as long as it still needs it (miss) and is not preempted (preempt). The motherboard 30 stays in the OWNW state by following self loop 160. When the motherboard 30 is in the OWNW state 144 and still wants the bus (miss), a preempt from another device will cause the motherboard to enter the INTERLOPE state 146 by following path 214, thus extending its allotment of time in control of the bus. If the motherboard 30, while still in the OWNW state 144 and not preempted (preempt), no longer requires the bus (miss), it will return to the OWND state 134 via path 218. Finally, if the motherboard 30 is in the OWNW state 144, does not require the bus 24 any longer (miss), and is preempted by another device (preempt), the motherboard 30 will enter the GIVEUP state 148 along path 210.

When the motherboard 30 enters the INTERLOPE state 146 as described above, it stays there for the duration of the "interlope delay time" by following self loop 168. When the "interlope delay time" expires (alarm), or if the motherboard 30 determines that it no longer needs the bus 24 (miss) it will move from the INTERLOPE state 146 to the GIVEUP state 148 by following path 212.

Suppose that the motherboard 30 again begins in the BUSYD state 130. If the motherboard 30 needs the bus 24 (miss), and either it is allowed to arbitrate under the "Fairness" policy (fairgo), or it is not conforming to the "Fairness" policy (fair), initiation of an arbitration cycle will cause it to move from the BUSYD state 130 to the ARBW state 142 via path 184. Once in the ARBW state 142, the motherboard 30 will behave as described above.

If the motherboard 30, again starting from the BUSYD state 130, determines that it does need the bus 24 (miss), and is either not conforming to the "Fairness" policy (fair) or is allowed to arbitrate under the "Fairness" policy (fairgo), and another CPU device currently has control of the bus (levcpu), but no arbitration cycle is taking place (arb), the motherboard 30 will enter the WAITW state 140 by way of path 186. Once in the WAITW state 140, the motherboard 30 will remain here as long as no arbitration cycle is taking place (arb) by following "self-loop" 156. The motherboard 30 leaves the WAITW state 140 whenever an arbitration cycle is initiated (arb), and moves to the ARBW state 142 along path 224, where it behaves as described above.

If the motherboard 30, once again starting from the BUSYD state 130, determines that it needs the bus 24 (miss), but is not allowed to arbitrate for the bus 24 because of the "Fairness" policy (fair & fairgo), it will move along path 180 into the FAIRS state 136. These same conditions will cause the motherboard 30 to remain in the FAIRS state 136 by following "self loop" 162. From the FAIRS state 136, if the motherboard 30 needs the bus 24 (miss), but another CPU device has control of the bus 24 (levcpu), and no arbitration cycle is taking place (arb), and either it is not conforming to the "Fairness" policy (fair) or it is allowed to arbitrate for the bus under the "Fairness" policy (fairgo), it will follow path 192 into the WAITW state 140, where it behaves as described above. On the other hand, if the motherboard 30 in the FAIRS state 136 needs the bus 24 (miss), no arbitration cycle is occurring (arb), a non-CPU device has control of the bus (levcpu) and the motherboard 30 is either not conforming to the "Fairness" policy (fair) or is allowed under the "Fairness" policy to arbitrate (fairgo), then the motherboard 30 will enter the POLITE state 138 via path 200. Furthermore, if the motherboard 30 is in the FAIRS state 136, but determines that it does not need the bus 24 (e,ovs/miss/ ) and that no arbitration cycle is occurring (arb), it will return to the BUSYD state 130 via path 182. If it does not need the bus 24 (miss), and an arbitration cycle is occurring (arb), it will move from the FAIRS state 136 to the ARBD state 132 along path 188.

If, while in the FAIRS state 136, the motherboard 30 finds that it needs the bus (miss), that it is either not conforming to (fair) or is allowed to arbitrate under (fairgo) the "Fairness" policy, and also finds that an arbitration has been initiated (arb), the motherboard 30 will move to the ARBW state 142 via path 194, where it will behave in the manner described above.

Once again starting from the BUSYD state 130, if the motherboard 30 determines that it needs the bus 24 (miss), that it is either not conforming to (fair) or is allowed to arbitrate under (fairgo) the "Fairness" policy, that a non-CPU device is currently in control of the bus (levcpu), and that no arbitration cycle is currently taking place (arb), the motherboard 30 will follow path 178 to enter the POLITE state 138.

The motherboard 30 will remain in the POLITE state 138 by following "self-loop" 164 as long as a "polite time delay" has not expired (alarm) and as long as no arbitration cycle occurs (arb). If an arbitration cycle is initiated while the motherboard 30 is in the POLITE state 138, and while it still needs the bus 24 (miss), the motherboard will move to the ARBW state 142, where it behaves as described above. If an arbitration cycle occurs (arb) while the motherboard 30 is in the POLITE state 138, but the motherboard no longer needs the bus 24 (miss), it will enter the ARBD state 132 via path 190. If the "polite time delay" expires while the motherboard 30 is in the POLITE state 138 (alarm), and no arbitration cycle is occurring (arb), it will follow path 196 to enter the WAITW state 140, where it will behave as described above. Finally, if the motherboard 30 is in the POLITE state 138, but it does not need the bus 24 (miss) and no arbitration cycle is occurring (arb), it will return to the BUSYD state 130 by way of path 176.

The state machine 124 of FIG. 7 has a number of output signals that are used to inform other motherboard arbitration logic 126 of the current state of the motherboard. In particular, these outputs are:

own: This signal is asserted by the state machine 124 whenever the motherboard 30 is in a state in which it owns the bus. The states in which the motherboard 30 has control of the bus are: The OWND state 134, the OWNW state 144, the INTERLOPE state 146, and the GIVEUP state 148.

preempt.out: This signal is asserted by the state machine 124 whenever the motherboard CPU 12 drives the preempt signal line 44 on the system bus 24. Specifically, the state machine 124 asserts this signal whenever the motherboard is in the WAITW state 140 or the ARBW state 142.

preempt.cut: When this signal is asserted, the preempt line 44 from the system bus 24 to the CACP is disabled, thereby delaying an arbitration cycle. The state machine 124 asserts this signal whenever the motherboard 30 is in the INTERLOPE state 146 or the OWNW state 144.

polite.strobe: This signal is asserted by the state machine 124 in order to initiate a "Politeness" delay during which the motherboard 30 is not allowed to assert preempt. The polite strobe signal is asserted by the state machine 124 any time that the motherboard 30 moves into the POLITE state 138, either along the path 200 of FIG. 7 from the FAIRS state 136, or along the path 176 from the BUSYD state 130.

interlope.strobe: This signal is asserted by the state machine 124 in order to initiate an "Interlope" time delay during which the motherboard 30 retains control of the system bus in spite of the fact that other devices have asserted preempt. The interlope strobe signal is asserted by the state machine 124 whenever the motherboard 30 moves into the INTERLOPE state 146 from the OWNW state 144 via the path 214.

In order to cause the motherboard 30 to behave in the manner described by the state diagram of FIG. 7, the state machine 124 which it defines is implemented as hardware logic on the motherboard 30, with the sources of the logical conditions listed above provided to the logic as inputs, and with signal lines used to control the activity of the motherboard available of outputs of the logic. Many techniques exist in the art for implementing state machines in hardware logic. In the preferred embodiment of the present invention, the state machine of FIG. 7 is implemented in the form of "Gate Array" logic on the motherboard 30.

FIG. 8 is a logic diagram of the implementation of the state machine 124 of FIG. 7 on the motherboard 30. In FIG. 8, the state machine 124 and the supporting hardware required to interface its inputs and outputs to the motherboard 30 and system bus 24 comprise the motherboard bus arbitration logic 126 of FIG. 6.

The collection of inputs 230 to the motherboard arbitration logic 126 comprise the interface between the motherboard processing unit 12 and the arbitration logic 126. The signals 230 provide the arbitration logic 126 with information regarding the motherboard processor's need for bus access resulting from cache memory 16 misses. The set of lines 232 comprise the interface between the motherboard arbitration logic 126 and the CACP 32, which consists of the arb/gnt line 48 and the incoming preempt line 44. The lines 234, which include the outgoing preempt line 44 and the arbitration bus 42, comprise the interface between the motherboard arbitration logic 126 and the system bus 24. The inputs 236 to the motherboard arbitration logic 126 provide this logic with information regarding the system configuration options, including a 4-bit bus NUM.CPUs 236a which carries the binary value corresponding to the number of processor modules interfaced to the bus, a line 236b called SYSTEM BOARD FAIR which indicates whether the motherboard 30 conforms to the "Fairness" policy in its arbitration for bus access, a line 236c called the ARB MODE line which indicates whether the modified arbitration scheme of the present invention is to be employed by the system, and two 8-bit busses INTERLOPE TIME 236d and POLITE TIME 236e which provide an 8-bit binary counter 238 with the binary values that determine the length of the "interlope delay time" and the "polite delay time," respectively, for the arbitration state machine 124.

Figure 9:
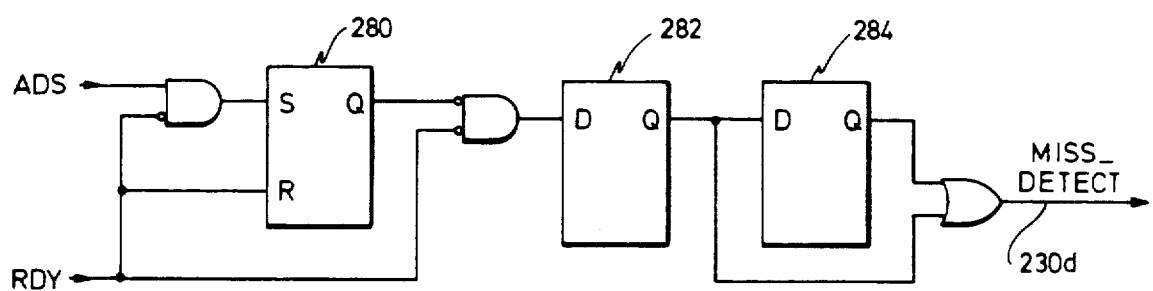
FIG. 9 is a logic diagram of the cache miss detector on the motherboard and coprocessor boards in the system of FIG. 6.

Miss Detection Circuitry:

The motherboard processor 12 will require access to the shared system bus 24 whenever a reference to main memory 14 cannot be serviced by the cache subsystem 16, or whenever main memory 14 must be updated with new data stored in the cache 16. The motherboard is informed of these situations by means of the set of input lines 230, called MISS.DETECT. The MISS.DETECT input 230 to the motherboard arbitration logic is taken from the output of cache miss detection circuitry of FIG. 9. As shown in FIG. 9, the inputs to the miss detection circuitry are the ADS and READY outputs from the motherboard CPU 12, which indicate the beginning and end of CPU instruction cycles, respectively. The three flip-flops 280, 282, 284 in the circuit of FIG. 9 are used to detect situations reflected by the ADS and READY inputs which indicate that execution of the current instruction will require bus access. The MISS.DETECT output 230 of the circuitry of FIG. 9 is used as the "MISS" input to the motherboard arbitration state machine 124.

Implementation of "Interlope" Policy:

Since the purpose of the "Interlope" policy is to extend the period of motherboard bus ownership, the motherboard 30 enters the INTERLOPE state 146 only from the OWNW state 144. When the motherboard 30 is in the OWNW state 144, it is using the bus after having won the latest arbitration. When in this state, the "own" and "preempt.cut" outputs on lines 247 and 249 of the motherboard state machine 124 are asserted.

The "own" output 247 indicates to the motherboard arbitration logic 124 that the motherboard 30 is currently in control of the bus, operating in either the OWNW state 144, the OWND state 134, the INTERLOPE state 146 or the GIVEUP state 148. The "own" signal on line 247 is used as an input to the circuit consisting of AND gates 248, 250, 252, D flip-flop 246 and RS flip-flop 254. This circuit functions to implement the "Fairness" policy for the motherboard 30 by asserting the state machine "fairgo" input on line 253 whenever the motherboard 30 is allowed to arbitrate for the bus under the "Fairness" policy.

The "preempt.cut" state machine output 249 is used to disconnect the preempt line 44 of the shared bus 24 from the CACP 32, so that arbitration cycles are not initiated when the "preempt.cut" signal is asserted. In particular, the "preempt.cut" output 249 of the state machine 124 is first ANDed (in gate 256) with the ARB MODE line 236c, which indicates whether the system should operate in accordance with this embodiment of the present invention, or in the traditional manner. The output of AND gate 256 is inverted and provided as the input to another AND gate 258, whose other input is the preempt line 44 from the bus 24. The output of AND gate 258 is then used as the preempt line input to the CACP 32. Thus, if "preempt.cut" is asserted and the system is operating in accordance with the present invention, the AND gate 258 is effectively disabled, preventing the CACP 32 from receiving preempt requests from any system device.

When the motherboard 30 is in the OWNW state 144 and another device asserts preempt (preempt), the motherboard 30 moves into the INTERLOPE state 146 via path 214. Whenever the motherboard follows path 214, the arbitration state machine 124 momentarily asserts the "interlope strobe" output 267. This output enables the bus driver 266 on the INTERLOPE TIME bus 236d, and the also passes through OR gate 270 into the LOAD input of delay timer 238. This causes the timer 238 to be loaded with the 8-bit "interlope delay time" and to begin counting down. The 8-bit "interlope delay time" can be provided on the INTERLOPE TIME bus 236d either from a "DIP" switch or from a programmable register, in a manner known in the art. The exact value of the "interlope delay time" can then be adjusted by resetting the "DIP" switches or reloading the register in order to fine-tune the system to operate most efficiently.

During the time that the timer 238 is counting down from the "interlope delay time" to zero, the motherboard 30 remains in control of the bus in the INTERLOPE state 146. In this state, the "own" and "preempt.cut" signals are still asserted, preventing the CACP 32 from initiating any arbitration cycles. When the timer 238 has counted down from the "interlope delay time" value to zero, the "zero" output 260 of timer 238 is used as the "alarm" input to the state machine 124, after being ANDed in gate 262 with the negated output of OR gate 270 to ensure that another value is not being loaded into the timer 238.

When the "alarm" input to the state machine 124 is asserted, the motherboard moves from the INTERLOPE state 146 to the GIVEUP state 148. Here, the motherboard 30 still is in control of the bus (own), but the "preempt cut" signal is released, reconnecting the preempt line 44 with the CACP 32, and allowing the CACP 32 to initiate an arbitration cycle if any device has requested one. Even if the motherboard 30 still has need of the bus 24 at this point, initiation of an arbitration cycle (arb) will force the motherboard 30 into the ARBD state, since, according to the "Fairness" policy, the motherboard 30 is not permitted to arbitrate for bus access immediately after relinquishing control.

Implementation of "Polite" Policy:

As depicted in the state diagram of FIG. 7, the motherboard 30 enters the POLITE state 138 in order to delay its entry into an arbitration state, thus allowing a non-CPU device that is in control of the bus 24 a longer time in which to satisfy its need for the bus 24 before being preempted. When the motherboard CPU 12 determines that it needs the bus 24, it will enter the POLITE state 138 rather than the ARBW state 142 or the WAITW state 140, if the device currently in control of the bus 24 is a non-CPU device (levcpu). The motherboard 30 can enter the POLITE state 138 either from the BUSYD state 130 via path 178, or from the FAIRS state 136, via path 200. Whenever the motherboard 30 moves along the path 178 or along the path 200, the state machine 124 momentarily asserts its "polite.strobe" output signal. As with the "interlope.strobe" signal, assertion of the "polite strobe" signal activates the bus driver 268 and, after passing through OR gate 270, causes the delay timer 238 to be loaded with the 8-bit "polite delay time" value from the POLITE TIME bus 236e. The delay timer 238 then immediately begins counting down to zero from the 8-bit "polite delay time" value. Just like the "interlope delay time", the "polite delay time" can be provided on the POLITE TIME bus 236e from a "DIP" switch or from a programmable register, and can be adjusted to achieve the most efficient "polite delay time".

During the time that the delay timer 238 is counting down, the motherboard 30 stays in the POLITE state 138 and does not assert preempt. If another device asserts preempt while the motherboard 30 is waiting in the POLITE state 138 and a new arbitration cycle is initiated, the motherboard 30 leaves the POLITE state 138 via path 202 to enter the ARBW state 142. If, on the other hand, the timer 238 reaches zero before another device asserts preempt, the "zero" output 260 of the timer 238 rises and activates the output of AND gate 262, thereby asserting the "alarm" input to the state machine 124. This causes the motherboard 30 to enter the WAITW state 140 via path 196.

In the WAITW state 140, the motherboard state machine 124 asserts its "preempt.out" output line. Recall that if the system is configured to operate in accordance with the present invention, the ARB MODE input 236c is asserted. The "preempt.out" state machine output is ANDed with the ARB MODE line 236c at AND gate 242. The output of the AND gate 242 provides control to the open-collector driver 244, so that when "preempt.out" is asserted, driver 244 drives the low-asserted preempt line 44 low (preempt), indicating to the CACP 32 that a device is requesting access to the bus. Thus, in the WAITW state 140, the motherboard 30 requests access to the bus and then waits for an arbitration cycle.

When an arbitration cycle is initiated (arb), the motherboard 30 moves via path 224 into the ARBW state 142. The motherboard 30 participates in arbitration by having its local arbiter 50 drive its arbitration priority level (1111) 2 on the arbitration bus 42 in the manner described above. If the motherboard is the winner of the arbitration, its priority level will remain on the arbitration bus 42. The AND gate 272 is wired to detect the motherboard's arbitration priority level on the arbitration bus 42, and the output of the AND gate 272 is provided to the state machine 124 as the "won" input. If the motherboard wins the arbitration, the "won" input to the state machine is asserted (won). This causes the motherboard 30 to follow path 220 into the OWNW state 144, where it behaves in the manner described above. If the motherboard 30 does not win the arbitration, however, it returns to the WAITW state 140, where it waits for another arbitration cycle to be initiated.

Implementation of "Loiter" Policy:

A final policy implemented in this embodiment of the present invention is not included in the state machine which describes the behavior of the motherboard 30. Instead, this policy, called the "Loiter" policy, is enforced only on coprocessor modules 120. FIG. 10 is a state diagram of a state machine 290 which describes the arbitration behavior of coprocessor boards 120 in the system of FIG. 6. The states and state transitions which remain unmodified from the motherboard state diagram of FIG. 7 have retained identical reference numbers in the state diagram of FIG. 10. Likewise, FIG. 11 is a logic diagram of the coprocessor board bus arbitration logic unit 122 of FIG. 6. Elements of FIG. 11 which remain unchanged from the motherboard arbitration logic unit 126 of FIG. 8 have also retained the same reference numbers.

The "Interlope", "Politeness" and "Fairness" policies are enforced on coprocessor boards 120 in exactly the same way as for the motherboard 30. In addition, however, the "Loiter" policy is enforced on coprocessor boards 120 so that these boards can retain control of the bus 24, for a period of time, after they have satisfied their bus requirements, as long as no other device has a pending request for bus access. If a coprocessor board 120 requires bus access again before it releases the bus, no arbitration cycle is necessary, and the coprocessor board 120 can satisfy its further bus requirements more quickly. The "Loiter" policy is not necessary for the motherboard 30, since it automatically retains control of the bus 24 if no other device requires access.

Referring to FIG. 10, a coprocessor board 130 that is in control of the bus stays in the OWNW state 144 by following "self loop" 160 with each machine cycle. A coprocessor board 120 will stay in the OWNW state 144 and in control of the bus 24 as long as it still needs access (miss) and it is not preempted (preempt). If a coprocessor board 120 in the OWNW state 144 satisfies its bus requirements (miss) before it is preempted by another device (preempt), the coprocessor board 120 will follow path 292 into the LOITER state 294. As the coprocessor board 120 moves along path 292, the delay timer 238 in FIG. 11 is loaded with the value on input lines 236f corresponding to the length of the "loiter delay time". The load of the timer 238 is initiated by the assertion of the "loiter.strobe" output 298 of the state machine 290, which simultaneously asserts the LOAD input to timer 238 and enables bus driver 300.

Once in the "Loiter" state 294, the coprocessor board 120 will remain in this state, and in control of the bus 24 as long as it is not preempted (preempt), it does not itself require use of the bus (miss), and the "loiter delay time" has not expired (alarm). If the coprocessor board 120 discovers, while it is in the "Loiter" state 294, that it again requires access to the bus 24 (miss), it follows path 296 back to the OWNW state 144. Thus, the coprocessor board 120 can use the bus 24 again without having to rearbitrate for it.

If, on the other hand, the coprocessor board 120 ks preempted while it is in the "Loiter" state 294 (preempt), it will begin to relinquish control of the bus by following path 204 into the GIVEUP state 148. After entering GIVEUP state 148, the coprocessor board behaves in the same manner as previously described for the motherboard 30.

If the coprocessor board 120 remains in the LOITER state 294 for the duration of the "loiter delay time" without being preempted (preempt), the delay timer 238 of FIG. 11 will decrement to a zero value, causing its "zero" output 260 to be asserted. "Zero" output 260 is ANDed, in AND gate 262, with an inverted version of the "Load" output of OR gate 270. The output of AND gate 262 is used as the "alarm" input to coprocessor board state machine 290 to indicate that the "loiter delay time" has expired. AND gate 262 functions to prevent false assertions of the "alarm" signal in the case that the timer count is zero before it is loaded. Such a false "alarm" would effectively cause a zero delay time. Asserting the "alarm" input to the state machine 290 causes a coprocessor board 120 in the LOITER state 294 to follow path 204 into the GIVEUP state 148. Again, behavior in the GIVEUP state 148 is exactly the same for a coprocessor board 120 as for the motherboard 30.

From the above detailed description of a preferred embodiment, it should be evident that a method of implementing bus arbitration has been disclosed which is well suited for computer systems having multiple processing modules each with local cache memory subsystems. The introduction of certain delays into the arbitration behavior of contending devices alleviates many of the inefficient and otherwise undesirable behavior patterns that may be encountered in multiple-processor bus arbitration. In one embodiment, these delay policies are enforced by means of arbitration logic associated with each contending device.

Although a specific embodiment of the present invention has been described in detail, it is to be understood that various changes, substitutions and alterations can be made therein without departing from the spirit and scope of the invention, as defined by the appended claims. In particular, there is flexibility in the exact design and implementation of the arbitration logic associated with the motherboard 30 and coprocessor boards 120. Since a number of different processors or coprocessors having input and output signals different than those described above might be used in a computer system employing the present invention, the particular implementation of arbitration logic units or miss detection circuits may be suitably modified. Furthermore, the present invention allows for variability in the lengths of the time delays associated with the "Interlope", "Politeness", and "Loiter" policies. In any particular implementation of the present invention, these time delay values may be fine-tuned to achieve the best possible system performance. Finally, with reference to the state diagrams of FIGS. 7 and 10, it should be noted that similar and/or equivalent state machines may be substituted which can include modifications directed to resolving subtle or unique synchronization and timing problems which might be encountered in a particular implementation.

What is claimed is:

1. A computer system with bus arbitration, comprising:
   (a) a plurality of devices sharing a common bus, any one of said devices asserting a request signal on said bus after said any one requires control of the bus and wherein all of said devices which may require control of said bus have means for detecting said request signal;
   (b) arbitration circuitry coupled to said bus and detecting said request signal and asserting an arbitrate signal on said bus in response to said request signal;
   (c) only those of said devices requiring control of said bus asserting a priority signal in response to said arbitrate signal, and one of the devices asserting a highest level of priority gaining control of said bus;
   (d) said one of the devices including a timing circuit to prevent said one of the devices from reasserting said request signal for at least a first preselected time period after relinquishing control of said bus and after said one of the devices requires control of said bus.

2. A system according to claim 1 including means in said one of the devices to prevent said one of the devices from relinquishing control of the bus for a second preselected time period after completing use of the bus unless during said second preselected time period said one of the devices detects said request signal being asserted.

3. A system according to claim 2 wherein said one of the devices is a processor device.

4. A system according to claim 1 wherein said one of the devices is a processor device, wherein said processor device includes means coupled to said arbitration circuitry for preventing said arbitration circuitry from asserting said arbitrate signal for a second preselected period of time after another of said devices asserts said request signal, unless said processor device completes use of said bus during said second preselected period of time.

5. A system according to claim 1, wherein said timing circuit further prevents said one of the devices from reasserting said request signal for said preselected time period after a first instant of time when said one of the devices does not detect said request signal after relinquishing control of said bus and after said one of the devices requires control of said bus.

6. A system according to claim 5, wherein said one of the devices is a processor device.

7. A multiprocessor system with bus arbitration, comprising:
   a) first and second processor devices and a plurality of other devices sharing a common bus, any one of said first and second devices and said other devices asserting a request signal on said bus after said any one requires control of said bus and wherein all of said devices which may require control of said bus have means to detect said request signal;
   b) arbitration circuitry coupled to said bus and detecting said request signal and asserting an arbitrate signal on said bus in response to said request signal;
   c) only those of said devices requiring control of said bus asserting a priority signal in response to said arbitrate signal, and one of the devices asserting a highest level of priority gaining control of said bus;
   d) said one of the devices including a timing circuit to prevent said one of the devices from reasserting said request signal for at least a first preselected time period after relinquishing control of said bus and after said one of the devices requires control of said bus.

8. A system according to claim 7 including means in said one of the devices to prevent said one of the devices from relinquishing control of the bus for a second preselected time period after completing use of the bus unless during said second preselected time period said one of the devices detects said request signal.

9. A system according to claim 8 wherein said one of the devices is said first processor device.

10. A system according to claim 7 wherein said one of the devices includes means coupled to said arbitration circuitry for preventing said arbitration circuitry from asserting said arbitrate signal for a second preselected time period after another of said devices asserts said request signal, unless said one of the devices completes use of said bus during said second preselected time period.

11. A system according to claim 10, wherein said one of the devices is said first processor device.

12. A system according to claim 7, wherein said timing circuit further prevents said one of the devices from reasserting said request signal for said preselected time period after a first instant of time when said one of the devices does not detect said request signal after relinquishing control of said bus and after said one of the devices requires control of said bus.

13. A system according to claim 12, wherein said one of the devices is a processor device and one of said plurality of other devices has control of said bus after said processor device relinquishes control of said bus.

14. A method for arbitrating for control of a common bus shard by a plurality of devices in a computer system, comprising the step of:
   a) providing a condition wherein a device requests control of said bus, wherein all of said devices wanting control of said bus can provide said condition;
   b) detecting said condition wherein said device requests control of said bus, and a condition wherein any device previously having control of said bus has relinquished control;
   c) when said conditions have been detected, asserting an arbitrate condition by signaling to all of said devices via said bus;
   d) detecting said arbitrate condition at all of said devices requesting control of said bus and asserting a priority code onto said bus by only those of said devices requesting control of said bus;
   e) withdrawing said priority code by all of said devices asserting a lower priority code to leave only a highest of the priority codes asserted, and the one of said devices asserting said highest of the priority codes assuming control of said bus;

f) when said one of said devices as completed use of said bus, said one of said devices relinquishing control of said bus and refraining from providing said condition wherein said device requests control of said bus for at least a first preselected period of time after said device wants control of said bus.

15. A method according to claim 14 wherein said devices include first and second processor devices, and wherein on of said processor devices asserts a higher priority than the other.

16. A method according to claim 14 wherein each one of said devices asserts a different priority code.

17. A method according to claim 14 wherein said one of the devices is a processor device, and said processor device retains control of said bus for a second preselected period of time after it has completed use of said bus, before said step of relinquishing control of said bus, unless during said second preselected period of time said condition wherein a device request access to said bus is detected.

18. A method according to claim 14 wherein said one of said devices having control of said bus prevents detection of said condition wherein another device request control of said bus for a second preselected period of time.

19. A method according to claim 18 wherein said first of said devices is a CPU.

20. A method according to claim 14, wherein when said one of the devices has completed use of said bus, relinquishing control of said bus and further refraining from providing said condition wherein said one of the devices request control of said bus for said preselected period of time after a first instant of time when said condition wherein any device requests control of said bus is not detected and said one of the devices wants control of said bus.

21. A method according to claim 20, wherein said one of the devices is a processor device.

22. A method for arbitrating for control of a common bus shared by first and second CPU devices and a plurality of other devices in a computer system, comprising the steps of:

a) detecting a condition wherein any one of said devices requests control of said bus;

b) asserting an arbitrate condition in response to detecting said request condition by signaling to all of said devices via said bus;

c) detecting said arbitrate condition at all of said devices requesting control of said bus and asserting a priority code onto said bus only those of said devices requesting control of said bus to determine which one of said devices is asserting a highest of the priority codes and allowing said one of the devices to assume control of said bus;

d) when said one of the devices has completed use of said bus, said one of the devices relinquishing control of said bus and refraining from requesting control of said bus for at least a first preselected period of time after said one of the devices wants control of said bus.

23. A method according to claim 22 wherein said devices include first and second processor devices, and wherein one of said processor devices asserts a higher priority than the other.

24. A method according to claim 22 wherein each one of said devices asserts a different priority code.

25. A method according to claim 22 wherein said one of the devices is a processor device, and said processor device retains control of said bus for a second preselected period of time after it has completed use of said bus, before said step of relinquishing control of said bus, unless during said second preselected period of time said condition wherein a device requests control of said bus is detected.

26. A method according to claim 22 wherein an arbitration condition is asserted upon detecting said condition wherein a device requests control of said bus, and wherein a first of said devices while having control of said bus prevents detection of said condition wherein a device requests control of said bus for a second preselected period of time.

27. A method according to claim 22, wherein said one of the devices has completed use of said bus, relinquishing control of said bus for said preselected period of time after a first instant of time when said condition wherein any device requests control of said bus is not detected and said one of the devices wants control of said bus.

28. A method according to claim 27, wherein said one of the devices is a CPU device and one of said plurality of other devices has control of said bus.

* * * * *

UNITED STATES PATENT AND TRADEMARK OFFICE
CERTIFICATE OF CORRECTION

PATENT NO.   :   5,168,568
DATED        :   DECEMBER 1, 1992
INVENTOR(S)  :   JOHN S. THAYER, ET AL.

It is certified that error appears in the above-identified patent and that said Letters Patent is hereby corrected as shown below:

In col. 24, line 47, please replace "shard" with --shared--.

In col. 24, line 48, please replace "step" with --steps--.

In col. 25, line 1, please replace "as" with --has--.

In col. 26, line 40, after "of said bus" please insert --and further refraining from requesting control of said bus--.

In col. 25, line 10, please replace "on" with --one--.

Signed and Sealed this

Second Day of November, 1993

*Attest:*

BRUCE LEHMAN

*Attesting Officer*     Commissioner of Patents and Trademarks